United States Patent
Lu et al.

(10) Patent No.: US 11,856,590 B2
(45) Date of Patent: Dec. 26, 2023

(54) METHOD FOR OBTAINING NETWORK SYSTEM RESOURCE ALLOCATION, TERMINAL, NETWORK DEVICE, AND SYSTEM

(71) Applicant: ZTE Corporation, Guangdong (CN)

(72) Inventors: Ting Lu, Guangdong (CN); Bo Dai, Guangdong (CN); Yuanfang Yu, Guangdong (CN); Xu Liu, Guangdong (CN); Xiubin Sha, Guangdong (CN)

(73) Assignee: ZTE Corporation, Shenzhen (CN)

( * ) Notice: Subject to any disclaimer, the term of this patent is extended or adjusted under 35 U.S.C. 154(b) by 61 days.

(21) Appl. No.: 17/457,633

(22) Filed: Dec. 3, 2021

(65) Prior Publication Data

US 2022/0201652 A1  Jun. 23, 2022

Related U.S. Application Data

(63) Continuation of application No. 16/274,169, filed on Feb. 12, 2019, now Pat. No. 11,197,268, which is a (Continued)

(30) Foreign Application Priority Data

Aug. 12, 2016 (CN) .......................... 201610665418.3
Sep. 29, 2016 (CN) .......................... 201610866458.4

(51) Int. Cl.
*H04W 72/30* (2023.01)
*H04L 1/1607* (2023.01)
(Continued)

(52) U.S. Cl.
CPC ........... *H04W 72/30* (2023.01); *H04L 1/1614* (2013.01); *H04W 24/08* (2013.01);
(Continued)

(58) Field of Classification Search
None
See application file for complete search history.

(56) References Cited

U.S. PATENT DOCUMENTS

| 2015/0156242 A1 | 6/2015 | Hwang et al. |
| 2016/0352464 A1 | 12/2016 | Shen et al. |

(Continued)

FOREIGN PATENT DOCUMENTS

| CN | 103023618 A | 4/2013 |
| CN | 103746708 A | 4/2014 |

(Continued)

OTHER PUBLICATIONS

ERICSSON,"UEreconfiguration to a non-anchor carrier in NB-IoT", 3GPP TSG RAN WG2 #93bis, R2-162769, Apr. 2016. (Year: 2016).*

(Continued)

*Primary Examiner* — Saumit Shah
(74) *Attorney, Agent, or Firm* — Perkins Coie LLP

(57) ABSTRACT

Provided is a method for obtaining a network system resource configuration. The method includes that: a terminal receives a non-anchor carrier configuration broadcast by a network device, and the terminal determines, according to the non-anchor carrier configuration, resource information for performing random access or monitoring pages with the network device. The non-anchor carrier configuration includes any one of or any combination of: a non-anchor carrier frequency point list, a non-anchor carrier configuration parameter list, an uplink non-anchor carrier frequency point list, an uplink non-anchor carrier configuration parameter list, a downlink non-anchor carrier frequency point list and a downlink non-anchor carrier configuration parameter list.

18 Claims, 2 Drawing Sheets

Related U.S. Application Data continuation of application No. PCT/CN2017/097253, filed on Aug. 11, 2017.

(51) Int. Cl.
  *H04W 24/08* (2009.01)
  *H04W 72/0453* (2023.01)
  *H04W 74/08* (2009.01)
  *H04W 72/23* (2023.01)

(52) U.S. Cl.
  CPC ....... *H04W 72/0453* (2013.01); *H04W 72/23* (2023.01); *H04W 74/0833* (2013.01)

(56) References Cited

U.S. PATENT DOCUMENTS

| | | |
|---|---|---|
| 2017/0005753 A1 | 1/2017 | Shen et al. |
| 2018/0192313 A1* | 7/2018 | Axmon ............. H04W 28/0205 |
| 2019/0166578 A1* | 5/2019 | Chang ................... H04W 68/06 |
| 2020/0083912 A1 | 3/2020 | Chen et al. |
| 2022/0399906 A1 | 12/2022 | Chen et al. |

FOREIGN PATENT DOCUMENTS

| | | | | |
|---|---|---|---|---|
| CN | 105811998 A | 7/2016 | | |
| CN | 105874736 A | 8/2016 | | |
| KR | 10224411 B1 | 4/2021 | | |
| WO | WO-2010124228 A2 * | 10/2010 | ........... | H04L 5/0048 |
| WO | 2018127206 A1 | 7/2018 | | |

OTHER PUBLICATIONS

ZTE,"Considerations on multiple carriers operation for NB-IoT", 3GPP TSG RAN WG2 Meeting #93, R2-161394, Feb. 2016. (Year: 2016).*

ZTE: "Considerations on multiple carriers operation for NB-IoT", 3GPP Draft; R2-161394 Multiple NB-IoT Carriers Operation, 3rd Generation Partnership Project (3GPP), vol. RAN WG2, no. St Julian's, Malta; Feb. 15, 2016-Feb.19, 2016 Feb. 14, 2016 (Feb. 14, 2016), XP051055292.

EPO, Communication pursuant to Article 94(3) EPC for Application No. 17838833.6, dated Jun. 3, 2022, 7 pages.

Ericsson, "Considerations of CBRM and HARQ Operations," 3GPP TSG RAN WG1 #49bis, Orlando, USA, R1-073030, 4 pages, Jun. 25-29, 2007.

CNIPA, Office Action for Chinese Patent Application No. 201710056532.0, dated Sep. 28, 2022. 6 pages with unofficial translation.

CNIPA, Office Action for Chinese Patent Application No. 201610866458.4, dated Feb. 24, 2023, 15 pages with unofficial translation.

* cited by examiner

METHOD FOR OBTAINING NETWORK SYSTEM RESOURCE ALLOCATION, TERMINAL, NETWORK DEVICE, AND SYSTEM

CROSS REFERENCE TO RELATED APPLICATIONS

This patent document is a continuation of U.S. patent application Ser. No. 16/274,169 entitled "METHOD FOR OBTAINING NETWORK SYSTEM RESOURCE ALLOCATION, TERMINAL, NETWORK DEVICE, AND SYSTEM", filed on Feb. 12, 2019, which is a continuation and claims priority to International Patent Application No. PCT/CN2017/097253, filed on Aug. 11, 2017, which claims the benefit of priority of Chinese Patent Application No. 201610665418.3, filed on Aug. 12, 2016, and Chinese Patent Application No. 201610866458.4, filed on Sep. 29, 2016. The entire contents of the before-mentioned patent applications are incorporated by reference as part of the disclosure of this application.

TECHNICAL FIELD

The present disclosure relates to, but is not limited to, the field of radio communications and, in particular, relates to a method for obtaining a network system resource configuration, a terminal, a network device and a system.

BACKGROUND

With the development of wireless communication technologies, in the research of 5th Generation (5G) mobile communication technology, narrowband-Internet of things (NB-IoT), a research sub-topic of machine type communication (MTC), has been proposed. The NB-IoT provides a low-throughput wireless communication service in a 200 kHz spectral bandwidth for low-cost user equipment (UE).

In the existing art, a single-carrier cell within the 200 kHz spectral bandwidth has a small capacity, and is difficult to support the traffic transmission of a large number of NB-IoT terminals. Therefore, a multi-carrier cell strategy is introduced, that is, multiple single-carrier cells covered in the same area under the same base station are aggregated into a multi-carrier cell. The multiple single-carrier cells share one physical cell identifier, and transmit a broadcast channel and a synchronization channel on one single carrier, this single carrier is called an anchor carrier, and other multiple single carriers are used for providing the uplink and downlink traffic channel transmission and these multiple single carriers are called non-anchor carriers.

SUMMARY

The applicant finds that, in the implementation of the multi-carrier cell strategy, a large number of terminals simultaneously monitor pages or initiate the random access, but each of the terminals can only monitor pages or initiate the random access on one single carrier, causing that the paging and random access capacity of a network device is poor.

Therefore, embodiments of the present disclosure provide a method for obtaining a network system resource configuration, a terminal, a network device and a system.

A method for obtaining a network system resource configuration includes:

a terminal receives a non-anchor carrier configuration broadcast by a network device, where the non-anchor carrier configuration includes any one of or any combination of: a non-anchor carrier frequency point list, a non-anchor carrier configuration parameter list, an uplink non-anchor carrier frequency point list, an uplink non-anchor carrier configuration parameter list, a downlink non-anchor carrier frequency point list and a downlink non-anchor carrier configuration parameter list; and the terminal determines according to the non-anchor carrier configuration, resource information for performing random access or monitoring pages with the network device.

In one exemplary embodiment, the non-anchor carrier configuration further includes any one of or any combination of:

a random access resource configuration list for non-anchor carriers, a reference signal receiving power (RSRP) threshold for radio coverage level list for non-anchor carriers and a RSRP threshold for radio coverage level list for downlink non-anchor carriers.

In one exemplary embodiment, the non-anchor carrier configuration further includes any one of or any combination of:

a paging parameter configuration list for non-anchor carriers and a paging parameter configuration list for downlink non-anchor carriers.

In one exemplary embodiment, the non-anchor carrier configuration further includes any one of or any combination of:

an indication configured for each non-anchor carrier indicating whether the non-anchor carrier is available for random access;

an indication configured for each non-anchor carrier indicating whether the non-anchor carrier is available for monitoring pages; and an indication configured for each non-anchor carrier indicating whether the non-anchor carrier is available for monitoring and receiving a physical downlink control channel (PDCCH) channel.

The non-anchor carrier includes any one of: the non-anchor carrier, an uplink non-anchor carrier and a downlink non-anchor carrier.

In one exemplary embodiment, for the non-anchor carrier configured to be available for monitoring pages, the non-anchor carrier configuration further includes any one of or any combination of:

the paging parameter configuration list for the non-anchor carriers and the paging parameter configuration list for the downlink non-anchor carriers.

In one exemplary embodiment, the paging parameter configuration list further includes any one of or any combination of:

a carrier selection weighting factor shared by the non-anchor carriers or a carrier selection weighting factor separately configured for each non-anchor carrier;

a discontinuous reception (DRX) period shared by the non-anchor carriers or a DRX period separately configured for each non-anchor carrier;

a number of paging opportunities per DRX period shared by the non-anchor carriers or a number of paging opportunities per DRX period separately configured for each non-anchor carrier; and a non-anchor carrier frequency band feature parameter configured for each non-anchor carrier.

The non-anchor carrier includes any one of: the non-anchor carrier and the downlink non-anchor carrier.

In one exemplary embodiment, the method includes:

the terminal receives a random access carrier configuration broadcast by the network device and corresponding to each radio coverage level, where the random access carrier configuration further includes any one of or any combination of: a carrier frequency point, a carrier frequency point list, an anchor carrier frequency point, an anchor carrier frequency point list, a non-anchor carrier frequency point, the non-anchor carrier frequency point list, an uplink non-anchor carrier frequency point, the uplink non-anchor carrier frequency point list, a carrier sequence number, a carrier sequence number list, an anchor carrier sequence number, an anchor carrier sequence number list, a non-anchor carrier sequence number, a non-anchor carrier sequence number list, an uplink non-anchor carrier frequency point sequence number, an uplink non-anchor carrier frequency point sequence number list, random access resource configurations corresponding to the above frequency points or frequency point lists. The carrier frequency point includes the anchor carrier frequency point and the non-anchor carrier frequency point, and the carrier frequency point list includes the anchor carrier frequency point list and the non-anchor carrier frequency point list.

In one exemplary embodiment, the method includes:

the terminal receives a paging carrier configuration broadcast by the network device and corresponding to each radio coverage level, where the paging carrier configuration further includes any one of or any combination of: a carrier frequency point, a carrier frequency point list, an anchor carrier frequency point, an anchor carrier frequency point list, a non-anchor carrier frequency point, the non-anchor carrier frequency point list, a downlink non-anchor carrier frequency point, the downlink non-anchor carrier frequency point list, a carrier sequence number, a carrier sequence number list, an anchor carrier sequence number, an anchor carrier sequence number list, a non-anchor carrier sequence number, a non-anchor carrier sequence number list, a downlink non-anchor carrier frequency point sequence number, a downlink non-anchor carrier frequency point sequence number list, the paging resource configurations corresponding to the above frequency points or frequency point lists. The carrier frequency point includes the anchor carrier frequency point and the non-anchor carrier frequency point, and the carrier frequency point list includes the anchor carrier frequency point list and the non-anchor carrier frequency point list.

In one exemplary embodiment, the paging carrier configuration further includes any one of or any combination of:

a carrier selection weighting factor shared by the non-anchor carriers or a carrier selection weighting factor separately configured for each non-anchor carrier;

a discontinuous reception (DRX) period shared by the non-anchor carriers or a DRX period separately configured for each non-anchor carrier;

a number of paging opportunities per DRX period shared by the non-anchor carriers or a number of paging opportunities per DRX period separately configured for each non-anchor carrier; and a non-anchor carrier frequency band feature parameter configured for each non-anchor carrier.

The non-anchor carrier includes any one of: the non-anchor carrier and the downlink non-anchor carrier.

In one exemplary embodiment, the carrier feature parameter includes at least one of: a guard band, an in-band and a standalone band.

In one exemplary embodiment, the method further includes:

the terminal obtains first indication information broadcast by the network device, where the first indication information is used for instructing the terminal to monitor pages through a first non-anchor carrier, or a first downlink non-anchor carrier, or the first non-anchor carrier and the first downlink non-anchor carrier;

alternatively, the terminal obtains third indication information broadcast by the network device, where the third indication information is used for instructing the terminal to monitor pages through a first anchor carrier;

alternatively, the terminal obtains fifth indication information broadcast by the network device, where the fifth indication information is used for instructing the terminal to monitor pages through the first anchor carrier, the first non-anchor carrier, or the first downlink non-anchor carrier, where the first non-anchor carrier includes at least one non-anchor carrier in the non-anchor carrier configuration, the first downlink non-anchor carrier includes at least one downlink non-anchor carrier in the non-anchor carrier configuration, and the first anchor carrier includes at least one anchor carrier in an anchor carrier list broadcast by a system;

alternatively, the terminal obtains seventh indication information broadcast by the network device, where the seventh indication information is used for indicating whether resources used by the terminal for monitoring pages through include the anchor carrier.

In one exemplary embodiment, the method further includes: the terminal obtains second indication information broadcast by the network device, where the second indication information is used for instructing the terminal to perform the random access through a second non-anchor carrier, or a second uplink non-anchor carrier, or the second non-anchor carrier and the second uplink non-anchor carrier;

alternatively, the terminal obtains fourth indication information broadcast by the network device, where the fourth indication information is used for instructing the terminal to perform the random access through a second anchor carrier;

alternatively, the terminal obtains sixth indication information broadcast by the network device, where the sixth indication information is used for instructing the terminal to perform the random access through the second anchor carrier, the second non-anchor carrier, or the second uplink non-anchor carrier, where the second non-anchor carrier includes at least one non-anchor carrier in the non-anchor carrier configuration or the random access carrier configuration, the second uplink non-anchor carrier includes at least one uplink non-anchor carrier in the non-anchor carrier configuration or the random access carrier configuration, and the second anchor carrier includes at least one anchor carrier in an anchor carrier list broadcast by the network device;

alternatively, the terminal obtains eighth indication information broadcast by the network device, where the eighth indication information is used for indicating whether resources used by the terminal for performing the random access include the anchor carrier.

In one exemplary embodiment, the method further includes: the terminal receives a carrier configuration corresponding to each radio coverage level, where the carrier configuration is broadcast by the network device and monitored for receiving a PDCCH channel. The carrier configuration monitored for receiving the PDCCH channel at least includes any one of or any combination of: a carrier frequency point, a carrier frequency point list, an anchor carrier frequency point, an anchor carrier frequency point list, a non-anchor carrier frequency point, the non-anchor carrier frequency point list, a downlink non-anchor carrier frequency point, a downlink non-anchor carrier frequency point list, a carrier sequence number, a carrier sequence number list, an anchor carrier sequence number, an anchor carrier sequence number list, a non-anchor carrier sequence number, a non-anchor carrier sequence number list, a downlink non-anchor carrier frequency point sequence number, a downlink non-anchor carrier frequency point sequence number list. The carrier frequency point includes the anchor carrier frequency point and the non-anchor carrier frequency point, and the carrier frequency point list includes the anchor carrier frequency point list and the non-anchor carrier frequency point list.

In one exemplary embodiment, the method further includes:

the terminal determines according to a preset algorithm to select, in the carrier configuration monitored for receiving the PDCCH channel, a jth carrier to listen and receive a PDCCH channel when the terminal selects an ith carrier to initiate the random access in the random access carrier configuration.

In one exemplary embodiment, the preset algorithm further includes:

$$j = \begin{cases} Npd/i, & \text{if } Npd > Npa \\ (i \bmod Npd) + 1, & \text{if } Npd \leq Npa \end{cases}$$

Npd is a total number of carriers in the carrier configuration monitored for receiving the PDCCH channel, Npa is a total number of the carriers in the random access carrier configuration, and a minimum value of i and a minimum value of j are 1.

In one exemplary embodiment, the preset algorithm further includes:

$j=(i+N_{offset}) \bmod Npd$. $N_{offset}$ is a preset value or a constant, Npd is a total number of carriers in the carrier configuration monitored for receiving the PDCCH channel, Npa is a total number of the carriers in the random access carrier configuration, and a minimum value of i and a minimum value of j are 1.

In one exemplary embodiment, the preset algorithm further includes:

in response to determining that Npd=Npa, j=i, in response to determining that Npd≠Npa, $j=(i+N_{offset})$ mod Npd. $N_{offset}$ is a preset value or a constant. Npd is a total number of carriers in the carrier configuration monitored for receiving the PDCCH channel, Npa is a total number of the carriers in the random access carrier configuration, and a minimum value of i and a minimum value j are 1.

In one exemplary embodiment, the preset algorithm further includes:

in response to determining that Npd=Npa, j=i
in response to determining that Npd≠Npa $$j = \begin{cases} Npd/i, & \text{if } Npd > Npa \\ (i \bmod Npd) + 1, & \text{if } Npd < Npa \end{cases}$$

Npd is a total number of carriers in the carrier configuration monitored for receiving the PDCCH channel, Npa is a total number of the carriers in the random access carrier configuration, and a minimum value of i and a minimum value of j are 1.

In one exemplary embodiment, the method further includes:

the terminal receives a correspondence between a carrier configuration monitored for receiving the PDCCH channel and an uplink carrier configuration corresponding to any one of: each non-anchor carrier and each radio coverage level, where the correspondence is broadcast by the network device.

The uplink carrier configuration includes at least one of or any combination of: a carrier frequency point, a carrier frequency point list, an anchor carrier frequency point, an anchor carrier frequency point list, a non-anchor carrier frequency point, the non-anchor carrier frequency point list, an uplink non-anchor carrier frequency point, the uplink non-anchor carrier frequency point list, a carrier sequence number, a carrier sequence number list, an anchor carrier sequence number, an anchor carrier sequence number list, a non-anchor carrier sequence number, a non-anchor carrier sequence number list, an uplink non-anchor carrier frequency point sequence number, an uplink non-anchor carrier frequency point sequence number list.

The carrier configuration monitored for receiving the PDCCH channel includes at least one of or any combination of: the carrier frequency point, the carrier frequency point list, the anchor carrier frequency point, the anchor carrier frequency point list, the non-anchor carrier frequency point, the non-anchor carrier frequency point list, a downlink non-anchor carrier frequency point, a downlink non-anchor carrier frequency point list, the carrier sequence number, the carrier sequence number list, the anchor carrier sequence number, the anchor carrier sequence number list, the non-anchor carrier sequence number, the non-anchor carrier sequence number list, a downlink non-anchor carrier frequency point sequence number, a downlink non-anchor carrier frequency point sequence number list.

In one exemplary embodiment, the method further includes: in response to determining that the terminal selects a certain uplink carrier to initiate the random access, the terminal selects, according to the correspondence, the carrier configuration having the correspondence and monitored for receiving the PDCCH channel to listen and receive the PDCCH channel. The correspondence includes at least one of or any combination of:

a correspondence in which one uplink carrier configuration corresponds to one carrier configuration monitored for receiving the PDCCH channel;

a correspondence in which one uplink carrier configuration corresponds to multiple carrier configurations monitored for receiving the PDCCH channel; where the multiple carrier configurations monitored for receiving the PDCCH channel are represented in a Bitmap, the carrier corresponding to the uplink carrier configuration is represented by a preset value 1 in the Bitmap, and the carrier not corresponding to the uplink carrier configuration is represented by a preset value 2 in the Bitmap;

a correspondence in which multiple uplink carrier configurations correspond to one carrier configuration monitored for receiving the PDCCH channel; where the multiple uplink carrier configurations are represented in a Bitmap, a preset value 1 in the Bitmap represents a carrier corresponding to the carrier configuration monitored for receiving the PDCCH channel, and a preset value 2 in the Bitmap represents a carrier not corresponding to the carrier configuration monitored for receiving the PDCCH channel.

In one exemplary embodiment, the method further includes:

the terminal determines, according to a preset algorithm, in the carrier configuration monitored for receiving the PDCCH channel and having the correspondence, to select a jth carrier to monitor and receive the PDCCH channel when the terminal selects an ith carrier to initiate the random access in the uplink carrier configuration.

In one exemplary embodiment, the preset algorithm further includes:

in response to determining that Npd=Npa, j=i, in response to determining that Npd≠Npa, j=(i+k0*Ns) mod Npd+N0

Npd is a total number of carriers in the carrier configuration monitored for receiving the PDCCH channel and having the correspondence, Npa is a total number of the carriers in the random access carrier configuration, or the Npa is a total number of the carriers in the uplink carrier configuration having the correspondence, Ns is a subcarrier identity factor of the ith carrier in the random access carrier configuration or a function input of the subcarrier identity factor, or Ns is a current coverage level factor of the terminal or a function of the current coverage level factor, k0 and N0 are preset constants.

In one exemplary embodiment, the preset algorithm further includes:

in response to determining that Npd=Npa, j=i, in response to determining that Npd≠Npa, effective values of Ns on the ith carrier are divided into Npd segments, and the segments are identified by M1, M2, . . . MNpd in an ascending order. In response to determining that the terminal initiates the random access on the ith carrier, the carrier monitored for receiving the PDCCH channel is selected according to which one of the Npd segments the value of Ns in a selected random access resource falls into. For example, the value of Ns in the selected random access resource falls into a Mjth segment, the jth carrier is selected as the carrier monitored for receiving the PDCCH channel.

Npd is a total number of carriers in the carrier configuration monitored for receiving the PDCCH channel and having the correspondence, Npa is a total number of the carriers in the random access carrier configuration, or the Npa is a total number of the carriers in the uplink carrier configuration, Ns is a subcarrier identity factor in the random access carrier configuration or a function of the subcarrier identity factor, or Ns is a current coverage level factor of the terminal or a function of the current coverage level factor.

In one exemplary embodiment, the preset algorithm further includes:

in response to determining that Npd=Npa, j=i, in response to determining that Npd≠Npa, j=j=(i+k1*T) mod Npd+N1, Npd is a total number of carriers in the carrier configuration monitored for receiving the PDCCH channel and having the correspondence, Npa is a total number of the carriers in the random access carrier configuration, or the Npa is a total number of the carriers in the uplink carrier configuration, T is a time domain factor, and k1 and N1 are preset constants.

In one exemplary embodiment, the time domain factor includes at least one of: a sequence number of a first radio frame in the selected random access resource, a sequence number of a first radio subframe in the selected random access resource, a sequence number of a first radio frame transmitting a random access preamble, and a sequence number of a first radio subframe transmitting the random access preamble.

In one exemplary embodiment, N0=1, N1=1, k0 is a maximum value of i, k1 is the maximum value of i, and the minimum value of i and the minimum value of j are 1.

In one exemplary embodiment, each item of each of the non-anchor carrier configuration parameter list, the uplink non-anchor carrier configuration parameter list, and the downlink non-anchor carrier configuration parameter list includes: other physical layer parameters.

In one exemplary embodiment, each item of each of the non-anchor carrier configuration parameter list, the uplink non-anchor carrier configuration parameter list, and the downlink non-anchor carrier configuration parameter list includes: a frequency band feature parameter. The carrier feature parameter includes one of: a guard band, an in-band and a standalone band.

In one exemplary embodiment, the random access resource configuration list for the non-anchor carriers at least includes one random access resource configuration corresponding to a radio coverage level.

In one exemplary embodiment, in response to determining that the non-anchor carrier configuration does not include the random access resource configuration, the random access resource configuration for the non-anchor carriers is the same as the random access resource configuration for anchor carriers by default.

In one exemplary embodiment, different non-anchor carriers have a same random access resource configuration or different random access resource configurations.

In one exemplary embodiment, the other physical layer parameters include at least one of or any combination of: a downlink subframe configuration, a downlink transmission gap configuration, a size of evolved universal terrestrial radio access (E-UTRA) control region in an in-band operation mode.

In one exemplary embodiment, the method further includes:

the terminal receives a difference between a radio coverage level RSRP threshold for the non-anchor carriers and a radio coverage level RSRP threshold for anchor carriers, where the difference is broadcast by the network device.

An embodiment of the present disclosure further includes a method for transmitting a network system resource configuration, which includes:

a network device determines a non-anchor carrier configuration to be broadcast to a terminal, where the non-anchor carrier configuration includes at least one of or any combination of: a non-anchor carrier frequency point list, a non-anchor carrier configuration parameter list, an uplink non-anchor carrier frequency point list, an uplink non-anchor carrier configuration parameter list, a downlink non-anchor carrier frequency point list and a downlink non-anchor carrier configuration parameter list; and the network device broadcasts the non-anchor carrier configuration to the terminal.

In one exemplary embodiment, the non-anchor carrier configuration further includes at least one of or any combination of:

a random access resource configuration list for non-anchor carriers, a reference signal receiving power (RSRP) threshold for radio coverage level list for non-anchor carriers and reference signal receiving power (RSRP) threshold for radio coverage level list for downlink non-anchor carriers.

In one exemplary embodiment, the method further includes:

the network device broadcasts a random access carrier configuration corresponding to each radio coverage level to the terminal, where the random access carrier configuration further includes at least one of or any combination of: a carrier frequency point, a carrier frequency point list, an anchor carrier frequency point, an anchor carrier frequency point list, a non-anchor carrier frequency point, a non-anchor carrier frequency point list, an uplink non-anchor carrier frequency point, an uplink non-anchor carrier frequency point list, a carrier sequence number, a carrier sequence number list, an anchor carrier sequence number, an anchor carrier sequence number list, a non-anchor carrier sequence number, a non-anchor carrier sequence number list, an uplink non-anchor carrier frequency point sequence number, an uplink non-anchor carrier frequency point sequence number list, random access resource configurations corresponding to the above frequency points or frequency point lists. The carrier frequency point includes the anchor carrier frequency point and the non-anchor carrier frequency point, and the carrier frequency point list includes the anchor carrier frequency point list and the non-anchor carrier frequency point list.

In one exemplary embodiment, the method further includes:

the network device broadcasts first indication information to the terminal, where the first indication information is used for instructing the terminal to monitor pages through a first non-anchor carrier, or a first downlink non-anchor carrier, or the first non-anchor carrier and the first downlink non-anchor carrier;

alternatively, the network device broadcasts third indication information to the terminal, where the third indication information is used for instructing the terminal to monitor pages through a first anchor carrier;

alternatively, the network device broadcasts fifth indication information to the terminal, where the fifth indication information is used for instructing the terminal to monitoring pages through the first anchor carrier, the first non-anchor carrier, or the first downlink non-anchor carrier, where the first non-anchor carrier includes at least one non-anchor carrier in the non-anchor carrier configuration, the first downlink non-anchor carrier includes at least one downlink non-anchor carrier in the non-anchor carrier configuration, and the first anchor carrier includes at least one anchor carrier in an anchor carrier list broadcast by a system;

alternatively, the network device broadcasts seventh indication information to the terminal, where the seventh indication information is used for indicating whether resources used by the terminal for monitoring pages include the anchor carrier.

In one exemplary embodiment, the method further includes: the network device broadcasts second indication information to the terminal, where the second indication information is used for instructing the terminal to perform the random access through a second non-anchor carrier, or a second uplink non-anchor carrier, or the second non-anchor carrier and the second uplink non-anchor carrier;

alternatively, the network device broadcasts fourth indication information to the terminal, where the fourth indication information is used for instructing the terminal to perform the random access through a second anchor carrier;

alternatively, the network device broadcasts sixth indication information to the terminal, where the sixth indication information is used for instructing the terminal to perform the random access through the second anchor carrier, the second non-anchor carrier, or the second uplink non-anchor carrier, where the second non-anchor carrier includes at least one non-anchor carrier in the non-anchor carrier configuration or the random access carrier configuration, the second uplink non-anchor carrier includes at least one uplink non-anchor carrier in the non-anchor carrier configuration or the random access carrier configuration, the second anchor carrier includes at least one anchor carrier in an anchor carrier list broadcast by the network device;

alternatively, the network device broadcasts eighth indication information to the terminal, where the eighth indication information is used for indicating whether resources used by the terminal for performing the random access include the anchor carrier.

In one exemplary embodiment, the method further includes: the network device broadcasts a carrier configuration to the terminal, where the carrier configuration is monitored for receiving a PDCCH channel and corresponds to each radio coverage level, the carrier configuration monitored for receiving the PDCCH channel at least includes one of or any combination of: a carrier frequency point, a carrier frequency point list, an anchor carrier frequency point, an anchor carrier frequency point list, a non-anchor carrier frequency point, the non-anchor carrier frequency point list, a downlink non-anchor carrier frequency point, the downlink non-anchor carrier frequency point list, a carrier sequence number, a carrier sequence number list, an anchor carrier sequence number, an anchor carrier sequence number list, a non-anchor carrier sequence number, a non-anchor carrier sequence number list, a downlink non-anchor carrier frequency point sequence number, a downlink non-anchor carrier frequency point sequence number list. The carrier frequency point includes the anchor carrier frequency point and the non-anchor carrier frequency point, and the carrier frequency point list includes the anchor carrier frequency point list and the non-anchor carrier frequency point list.

In one exemplary embodiment, each item of each of the non-anchor carrier configuration parameter list, the uplink non-anchor carrier configuration parameter list, and the downlink non-anchor carrier configuration parameter list includes: other physical layer parameters.

In one exemplary embodiment, the random access resource configuration list for the non-anchor carrier at least includes an item of the random access resource configuration corresponding to a radio coverage level.

In one exemplary embodiment, in response to determining that the non-anchor carrier configuration does not include the random access resource configuration, the random access resource configuration for the non-anchor carriers is the same as the random access resource configuration for anchor carriers by default.

In one exemplary embodiment, different non-anchor carriers have a same random access resource configurations or different random access resource configurations.

In one exemplary embodiment, the other physical layer parameters include at least one of or any combination of: a downlink subframe configuration, a downlink transmission gap configuration, a size of evolved universal terrestrial radio access (E-UTRA) control region in an in-band operation mode.

In one exemplary embodiment, the method further includes:

the network device broadcasts a difference between a radio coverage level RSRP threshold for the non-anchor carrier and a radio coverage level RSRP threshold for an anchor carrier to the terminal.

An embodiment of the present invention further provides a computer-readable storage medium storing computer-executable instructions. The instructions execute the method for obtaining the network system resource configuration when executed by a processor.

An embodiment of the present invention further provides a computer-readable storage medium storing computer-executable instructions. The instructions execute the method for transmitting the network system resource configuration when executed by a processor.

The embodiment of the present disclosure further includes a device for obtaining a network system resource configuration, which includes:

a receiving module, which is configured to receive a non-anchor carrier configuration broadcast by a network device, where the non-anchor carrier configuration includes at least one of or any combination of: a non-anchor carrier frequency point list, a non-anchor carrier configuration parameter list, an uplink non-anchor carrier frequency point list, an uplink non-anchor carrier configuration parameter list, a downlink non-anchor carrier frequency point list and a downlink non-anchor carrier configuration parameter list; and a determining module, which is configured to determine, according to the non-anchor carrier configuration, resource information for performing random access or monitoring pages with the network device.

In one exemplary embodiment, the non-anchor carrier configuration further includes at least one of or any combination of:

a random access resource configuration list for non-anchor carriers, a reference signal receiving power (RSRP) threshold for radio coverage level list for non-anchor carriers and a RSRP threshold for radio coverage level list for downlink non-anchor carriers.

In one exemplary embodiment, the non-anchor carrier configuration further includes at least one of or any combination of:

a paging parameter configuration list for the non-anchor carriers and a paging parameter configuration list for the downlink non-anchor carriers.

In one exemplary embodiment, the non-anchor carrier configuration further includes at least one of or any combination of:

an indication configured for each non-anchor carrier and indicating whether the non-anchor carrier is available for random access;

an indication configured for each non-anchor carrier and indicating whether the non-anchor carrier is available for monitoring pages; and an indication configured for each non-anchor carrier and indicating whether the non-anchor carrier is available for monitoring and receiving a physical downlink control channel (PDCCH) channel.

The non-anchor carrier includes any one of: the non-anchor carrier, an uplink non-anchor carrier and a downlink non-anchor carrier.

In one exemplary embodiment, for a non-anchor carrier configured to be available for monitoring pages, the non-anchor carrier configuration further includes at least one of or any combination of:

the paging parameter configuration list for the non-anchor carriers and the paging parameter configuration list for the downlink non-anchor carriers.

In one exemplary embodiment, the paging parameter configuration list further includes at least one of or any combination of:

a carrier selection weighting factor shared by the non-anchor carriers or a carrier selection weighting factor separately configured for each non-anchor carrier;

a discontinuous reception (DRX) period shared by the non-anchor carriers or a DRX period separately configured for each non-anchor carrier;

a number of paging opportunities per DRX period shared by the non-anchor carriers or a number of paging opportunities per DRX period separately configured for each non-anchor carrier; and a non-anchor carrier frequency band feature parameter configured for each non-anchor carrier.

The non-anchor carrier includes any one of: the non-anchor carrier and the downlink non-anchor carrier.

In one exemplary embodiment, the receiving module is configured to receive a random access carrier configuration corresponding to each radio coverage level broadcast by the network device, where the random access carrier configuration further includes at least one of or any combination of: a carrier frequency point, a carrier frequency point list, an anchor carrier frequency point, an anchor carrier frequency point list, a non-anchor carrier frequency point, the non-anchor carrier frequency point list, an uplink non-anchor carrier frequency point, the uplink non-anchor carrier frequency point list, a carrier sequence number, a carrier sequence number list, an anchor carrier sequence number, an anchor carrier sequence number list, a non-anchor carrier sequence number, a non-anchor carrier sequence number list, an uplink non-anchor carrier frequency point sequence number, an uplink non-anchor carrier frequency point sequence number list, random access resource configurations corresponding to the above frequency points or frequency point lists. The carrier frequency point includes the anchor carrier frequency point and the non-anchor carrier frequency point, and the carrier frequency point list includes the anchor carrier frequency point list and the non-anchor carrier frequency point list.

In an exemplary embodiment, the receiving module is further configured to:

receive a paging carrier configuration corresponding to each radio coverage level broadcast by the network device. The paging carrier configuration further includes at least one of or any combination of: a carrier frequency point, a carrier frequency point list, an anchor carrier frequency point, an anchor carrier frequency point list, the non-anchor carrier frequency point, the non-anchor carrier frequency point list, a downlink non-anchor carrier frequency point, the downlink non-anchor carrier frequency point list, a carrier sequence number, a carrier sequence number list, an anchor carrier sequence number, an anchor carrier sequence number list, a non-anchor carrier sequence number, a non-anchor carrier sequence number list, a downlink non-anchor carrier frequency point sequence number, a downlink non-anchor carrier frequency point sequence number list, paging resource configurations corresponding to the above frequency points or frequency point lists. The carrier frequency point includes the anchor carrier frequency point and the non-anchor carrier frequency point, and the carrier frequency point list includes the anchor carrier frequency point list and the non-anchor carrier frequency point list.

In one exemplary embodiment, the paging carrier configuration further includes at least one of or any combination of:

a carrier selection weighting factor shared by the non-anchor carriers or a carrier selection weighting factor separately configured for each non-anchor carrier;

a discontinuous reception (DRX) period shared by the non-anchor carriers or a DRX period separately configured for each non-anchor carrier;

a number of paging opportunities per DRX period shared by the non-anchor carriers or a number of paging opportunities per DRX period separately configured for each non-anchor carrier; and a non-anchor carrier frequency band feature parameter configured for the each non-anchor carrier.

The non-anchor carrier includes any one of the non-anchor carrier and the downlink non-anchor carrier.

In one exemplary embodiment, the carrier feature parameter includes at least one of: a guard band, an in-band and a standalone band.

In an exemplary embodiment, the receiving module is configured to obtain first indication information broadcast by the network device, where the first indication information is used for instructing the terminal to monitor pages through a first non-anchor carrier, or a first downlink non-anchor carrier, or the first non-anchor carrier and the first downlink non-anchor carrier;

alternatively, the receiving module is configured to obtain third indication information broadcast by the network device, where the third indication information is used for instructing the terminal to monitor pages through a first anchor carrier;

alternatively, the receiving module is configured to obtain fifth indication information broadcast by the network device, where the fifth indication information is used for instructing the terminal to monitor pages through the first anchor carrier, the first non-anchor carrier, or the first downlink non-anchor carrier, where the first non-anchor carrier includes at least one non-anchor carrier in the non-anchor carrier configuration, the first downlink non-anchor carrier includes at least one downlink anchor carrier in the non-anchor carrier configuration, and the first anchor carrier includes at least one anchor carrier in an anchor carrier list broadcast by a system;

alternatively, the receiving module is configured to obtain seventh indication information broadcast by the network device, where the seventh indication information is used for indicating whether resources used by the terminal for monitoring pages include the anchor carrier.

In an exemplary embodiment, the receiving module is configured to obtain second indication information broadcast by the network device, where the second indication information is used for instructing the terminal to perform the random access on a second non-anchor carrier, or a second uplink non-anchor carrier, or the second non-anchor carrier and the second uplink non-anchor carrier;

Alternatively, the receiving module is configured to obtain fourth indication information broadcast by the network device, where the fourth indication information is used for instructing the terminal to perform the random access on a second anchor carrier;

alternatively, the receiving module is configured to obtain sixth indication information broadcast by the network device, where the sixth indication information is used for instructing the terminal to perform the random access on the second anchor carrier, the second non-anchor carrier, or the second uplink non-anchor carrier, where the second non-anchor carrier includes at least one non-anchor carrier in the non-anchor carrier configuration or the random access carrier configuration, the second uplink non-anchor carrier includes at least one uplink non-anchor carrier in the non-anchor carrier configuration or the random access carrier configuration, and the second anchor carrier includes at least one anchor carrier in an anchor carrier list broadcast by the network device;

alternatively, the receiving module is configured to obtain eighth indication information broadcast by the network device, where the eighth indication information is used for indicating whether resources used by the terminal for performing the random access include the anchor carrier.

In one exemplary embodiment, the receiving module is configured to receive a carrier configuration broadcast by the network device, where the carrier configuration is monitored for receiving a PDCCH channel and corresponds to each radio coverage level. The carrier configuration monitored for receiving the PDCCH channel at least includes one of or any combination of: a carrier frequency point, a carrier frequency point list, an anchor carrier frequency point, an anchor carrier frequency point list, the non-anchor carrier frequency point, the non-anchor carrier frequency point list, a downlink non-anchor carrier frequency point, a downlink non-anchor carrier frequency point list, a carrier sequence number, a carrier sequence number list, an anchor carrier sequence number, an anchor carrier sequence number list, a non-anchor carrier sequence number, a non-anchor carrier sequence number list, a downlink non-anchor carrier frequency point sequence number, a downlink non-anchor carrier frequency point sequence number list. The carrier frequency point includes the anchor carrier frequency point and the non-anchor carrier frequency point, and the carrier frequency point list includes the anchor carrier frequency point list and the non-anchor carrier frequency point list.

In one exemplary embodiment, the receiving module is configured to determine, according to a preset algorithm, in a carrier configuration monitored for receiving the PDCCH channel, to select a jth carrier to monitor and receive the PDCCH channel when the terminal selects an ith carrier to initiate the random access in a random access carrier configuration.

In one exemplary embodiment, the preset algorithm further includes:

$$j = \begin{cases} Npd/i, & \text{if } Npd > Npa \\ (i \bmod Npd) + 1, & \text{if } Npd \leq Npa \end{cases}$$

Npd is a total number of carriers in the carrier configuration monitored for receiving the PDCCH channel, Npa is a total number of the carriers in the random access carrier configuration, and a minimum value of i and a minimum value of j are 1.

In one exemplary embodiment, the preset algorithm further includes:

$j = (i + N_{offset}) \bmod Npd$, where $N_{offset}$ is a preset value or a constant, Npd is a total number of carriers in the carrier configuration monitored for receiving the PDCCH channel, Npa is a total number of the carriers in the random access carrier configuration, and a minimum value of i and a minimum value of j are 1.

In one exemplary embodiment, the preset algorithm further includes:

in response to determining that Npd=Npa, j=i, in response to determining that Npd≠Npa, j=(i+$N_{offset}$) mod Npd, and $N_{offset}$ is a preset value or a constant. Npd is a total number of carriers in the carrier configuration monitored for receiving the PDCCH channel, Npa is a total number of the carriers in the random access carrier configuration, and a minimum value of i and a minimum value of j are 1.

In one exemplary embodiment, the preset algorithm further includes:

in response to determining that Npd=Npa, j=i, in response to determining that Npd≠Npa, $$j = \begin{cases} Npd/i, & \text{if } Npd > Npa \\ (i \bmod Npd) + 1, & \text{if } Npd < Npa \end{cases}$$

Npd is a total number of carriers in the carrier configuration monitored for receiving the PDCCH channel, Npa is a total number of the carriers in the random access carrier configuration, and a minimum value of i and a minimum value of j are 1.

In an exemplary embodiment, the receiving module is configured to:

receive information on a correspondence between a carrier configuration monitored for receiving the PDCCH channel and an uplink carrier configuration corresponding to any one of: each non-anchor carrier and each radio coverage level, where the information is broadcast by the network device.

The uplink carrier configuration includes at least one of or any combination of: a carrier frequency point, a carrier frequency point list, an anchor carrier frequency point, an anchor carrier frequency point list, a non-anchor carrier frequency point, the non-anchor carrier frequency point list, an uplink non-anchor carrier frequency point, the uplink non-anchor carrier frequency point list, a carrier sequence number, a carrier sequence number list, an anchor carrier sequence number, an anchor carrier sequence number list, a non-anchor carrier sequence number, a non-anchor carrier sequence number list, an uplink non-anchor carrier frequency point sequence number, an uplink non-anchor carrier frequency point sequence number list.

The carrier configuration monitored for receiving the PDCCH channel includes at least one of or any combination of: the carrier frequency point, the carrier frequency point list, the anchor carrier frequency point, the anchor carrier frequency point list, the non-anchor carrier frequency point, the non-anchor carrier frequency point list, a downlink non-anchor carrier frequency point, a downlink non-anchor carrier frequency point list, the carrier sequence number, the carrier sequence number list, the anchor carrier sequence number, the anchor carrier sequence number list, the non-anchor carrier sequence number, the non-anchor carrier sequence number list, a downlink non-anchor carrier frequency point sequence number, a downlink non-anchor carrier frequency point sequence number list.

In one exemplary embodiment, according to the correspondence, in response to determining that the terminal selects a certain uplink carrier to initiate the random access, the carrier configuration monitored for receiving the PDCCH channel and corresponding to the certain uplink carrier is selected to monitor and receive the PDCCH channel. The correspondence includes at least one of or any combination of:

a correspondence in which one uplink carrier configuration corresponds to one carrier configuration monitored for receiving the PDCCH channel;

a correspondence in which one uplink carrier configuration corresponds to multiple carrier configurations monitored for receiving the PDCCH channel; where the multiple carrier configurations monitored for receiving the PDCCH channel are represented in a Bitmap, in which a preset value 1 represents a carrier corresponding to the uplink carrier configuration, and a preset value 2 represents a carrier not corresponding to the uplink carrier configuration;

a correspondence in which multiple uplink carrier configurations correspond to one carrier configuration monitored for receiving the PDCCH channel; where the multiple uplink carrier configurations are represented in a Bitmap, in which a preset value 1 represents a carrier corresponding to the carrier configuration monitored for receiving the PDCCH channel, and a preset value 2 represents a carrier not corresponding to the carrier configuration monitored for receiving the PDCCH channel.

In an exemplary embodiment, the determining module is configured to:

when the terminal selects an ith carrier to initiate the random access in the uplink carrier configuration, determine, according to a preset algorithm, to select a jth carrier to monitor and receive a PDCCH channel in the carrier configuration monitored for receiving the PDCCH channel and having the correspondence.

In one exemplary embodiment, the preset algorithm further includes:

in response to determining that Npd=Npa, j=i, in response to determining that Npd≠Npa, j=(i+k0*Ns) mod Npd+N0

Npd is a total number of carriers in the carrier configuration monitored for receiving the PDCCH channel and having the correspondence, Npa is a total number of the carriers in the random access carrier configuration, or the Npa is a total number of the carriers in the uplink carrier configuration having the correspondence, Ns is a subcarrier identity factor of the ith carrier in the random access carrier configuration or a function of the subcarrier identity factor, or Ns is a current coverage level factor of the terminal or a function of the current coverage level factor, k0 and N0 are preset constants.

In one exemplary embodiment, the preset algorithm further includes:

in response to determining that Npd=Npa, j=i, in response to determining that Npd≠Npa, effective values of Ns on the ith carrier are divided into Npd segments, and the Npd segments may be identified as M1, M2, . . . MNpd in an ascending order. In response to determining that the terminal initiates the random access on the ith carrier, the carrier monitored for receiving the PDCCH channel is selected according to which one of the Npd segments the value of Ns in a selected random access resource falls into. For example, the value of Ns in the selected random access resource falls into a Mjth segment, the jth carrier is selected as the carrier monitored for receiving the PDCCH channel.

Npd is a total number of carriers in the carrier configuration monitored for receiving the PDCCH channel and having the correspondence, Npa is a total number of the carriers in the random access carrier configuration, or the Npa is a total number of the carriers in the uplink carrier configuration, Ns is a subcarrier identity factor in the random access carrier configuration or a function of the subcarrier identity factor, or Ns is a current coverage level factor of the terminal or a function of the current coverage level factor of the terminal.

In one exemplary embodiment, the preset algorithm further includes:

in response to determining that Npd=Npa, j=i, in response to determining that Npd≠Npa, j=(i+k1*T) mod Npd+N1.

Npd is a total number of carriers in the carrier configuration monitored for receiving the PDCCH channel and having the correspondence, Npa is a total number of the carriers in the random access carrier configuration, or the Npa is a total number of the carriers in the uplink carrier configuration, T is a time domain factor, and k1 and N1 are preset constants.

In one exemplary embodiment, the time domain factor includes at least one of: a sequence number of a first radio frame in the selected random access resource, a sequence number of a first radio subframe in the selected random access resource, a sequence number of a first radio frame transmitting a random access preamble, and a sequence number of a first radio subframe transmitting the random access preamble.

In one exemplary embodiment, N0=1, N1=1, k0 is a maximum value of i, k1 is the maximum value of i, and the minimum value of i and the minimum value of j are 1.

In one exemplary embodiment, each item of each of the non-anchor carrier configuration parameter list, the uplink non-anchor carrier configuration parameter list, and the downlink non-anchor carrier configuration parameter list includes: other physical layer parameters.

In one exemplary embodiment, each item of each of the non-anchor carrier configuration parameter list, the uplink non-anchor carrier configuration parameter list, and the downlink non-anchor carrier configuration parameter list includes: a frequency band feature parameter. The carrier feature parameter includes one of: a guard band, an in-band and a standalone band.

In one exemplary embodiment, the random access resource configuration list for the non-anchor carriers at least includes an item of the random access resource configuration corresponding to a radio coverage level.

In one exemplary embodiment, in response to determining that the non-anchor carrier configuration does not include the random access resource configuration, the random access resource configuration for the non-anchor carriers is the same as the random access resource configuration for anchor carriers by default.

In one exemplary embodiment, different non-anchor carriers have a same random access resource configuration or have different random access resource configurations.

In one exemplary embodiment, the other physical layer parameters include at least one of or any combination of: a downlink subframe configuration, a downlink transmission gap configuration, a size of evolved universal terrestrial radio access (E-UTRA) control region in an in-band operation mode.

In one exemplary embodiment, the device further includes:
the receiving module is further configured to receive a difference between a reference signal receiving power (RSRP) threshold for radio coverage level list for non-anchor carriers and a RSRP threshold for radio coverage level list for anchor carriers, where the difference is broadcast by the network device.

An embodiment of the present disclosure further includes a device for transmitting a network system resource configuration. The device includes:
a determining module, which is configured to determine a non-anchor carrier configuration to be broadcast to a terminal, where the non-anchor carrier configuration includes at least one of or any combination of: a non-anchor carrier frequency point list, a non-anchor carrier configuration parameter list, an uplink non-anchor carrier frequency point list, an uplink non-anchor carrier configuration parameter list, a downlink non-anchor carrier frequency point list and a downlink non-anchor carrier configuration parameter list; and
a broadcasting module, which is configured to broadcast the non-anchor carrier configuration to the terminal.

In one exemplary embodiment, the non-anchor carrier configuration further includes at least one of or any combination of:
a random access resource configuration list for non-anchor carriers, a reference signal receiving power (RSRP) threshold for radio coverage level list for the non-anchor carriers and a RSRP threshold for radio coverage level list for downlink non-anchor carriers.

In one exemplary embodiment, the broadcasting module is further configured to broadcast a random access carrier configuration corresponding to each radio coverage level to the terminal. The random access carrier configuration further includes at least one of or any combination of: a carrier frequency point, a carrier frequency point list, an anchor carrier frequency point, an anchor carrier frequency point list, a non-anchor carrier frequency point, the non-anchor carrier frequency point list, an uplink non-anchor carrier frequency point, the uplink non-anchor carrier frequency point list, a carrier sequence number, a carrier sequence number list, an anchor carrier sequence number, an anchor carrier sequence number list, a non-anchor carrier sequence number, a non-anchor carrier sequence number list, an uplink non-anchor carrier frequency point sequence number, an uplink non-anchor carrier frequency point sequence number list, random access resource configurations corresponding to the above frequency points or frequency point lists. The carrier frequency point includes the anchor carrier frequency point and the non-anchor carrier frequency point, and the carrier frequency point list includes the anchor carrier frequency point list and the non-anchor carrier frequency point list.

In an exemplary embodiment, the broadcasting module is configured to broadcast first indication information to the terminal, where the first indication information is used for instructing the terminal to monitor pages through a first non-anchor carrier, or a first downlink non-anchor carrier, or the first non-anchor carrier and the first downlink non-anchor carrier.

Alternatively, the broadcasting module is configured to broadcast third indication information to the terminal, where the third indication information is used for instructing the terminal to monitor pages through a first anchor carrier.

Alternatively, the broadcasting module is configured to broadcast fifth indication information to the terminal, where the fifth indication information is used for instructing the terminal to monitor pages through the first anchor carrier, the first non-anchor carrier, or the first downlink non-anchor carrier. The first non-anchor carrier includes at least one downlink non-anchor carrier in the non-anchor carrier configuration, the first downlink non-anchor carrier includes at least one downlink non-anchor carrier in the non-anchor carrier configuration, and the first anchor carrier includes at least one anchor carrier in an anchor carrier list broadcast by a system.

Alternatively, the broadcasting module is configured to broadcast seventh indication information to the terminal, where the seventh indication information is used for indicating whether resources used by the terminal for monitoring pages include the anchor carrier.

In an exemplary embodiment, the broadcasting module is configured to broadcast second indication information to the terminal, where the second indication information is used for instructing the terminal to perform the random access through a second non-anchor carrier, or a second uplink non-anchor carrier, or the second non-anchor carrier and the second uplink non-anchor carrier.

Alternatively, the broadcasting module is configured to broadcast fourth indication information to the terminal, where the fourth indication information is used for instructing the terminal to perform the random access through a second anchor carrier.

Alternatively, the broadcasting module is configured to broadcast sixth indication information to the terminal, where the sixth indication information is used for instructing the terminal to perform the random access through the second anchor carrier, the second non-anchor carrier, or the second uplink non-anchor carrier. The second non-anchor carrier includes at least one non-anchor carrier in the non-anchor carrier configuration or the random access carrier configuration, the second uplink non-anchor carrier includes at least one uplink non-anchor carrier in the non-anchor carrier configuration or the random access carrier configuration, the second anchor carrier includes at least one anchor carrier in an anchor carrier list broadcast by the network device.

Alternatively, the broadcasting module is configured to broadcast eighth indication information to the terminal, where the eighth indication information is used for indicating whether resources for performing the random access used by the terminal include the anchor carrier.

In one exemplary embodiment, the broadcasting module is configured to broadcast to the terminal a carrier configuration corresponding to each radio coverage level, where the carrier configuration is monitored for receiving a PDCCH channel. The carrier configuration monitored for receiving the PDCCH channel at least includes any one of or any combination of: a carrier frequency point, a carrier frequency point list, an anchor carrier frequency point, an anchor carrier frequency point list, a non-anchor carrier frequency point, the non-anchor carrier frequency point list, a downlink non-anchor carrier frequency point, the downlink non-anchor carrier frequency point list, a carrier sequence number, a carrier sequence number list, an anchor carrier sequence number, an anchor carrier sequence number list, a non-anchor carrier sequence number, a non-anchor carrier sequence number list, a downlink non-anchor carrier frequency point sequence number, a downlink non-anchor carrier frequency point sequence number list. The carrier frequency point includes the anchor carrier frequency point and the non-anchor carrier frequency point, and the carrier frequency point list includes the anchor carrier frequency point list and the non-anchor carrier frequency point list.

In one exemplary embodiment, each item of each of the non-anchor carrier configuration parameter list, the uplink non-anchor carrier configuration parameter list, and the downlink non-anchor carrier configuration parameter list includes: other physical layer parameters.

In one exemplary embodiment, the random access resource configuration list for the non-anchor carriers at least includes one item of the random access resource configuration corresponding to a radio coverage level.

In one exemplary embodiment, in response to determining that the non-anchor carrier configuration does not include the random access resource configuration, the random access resource configuration for the non-anchor carriers is the same as the random access resource configuration for the anchor carriers.

In one exemplary embodiment, different non-anchor carrier have a same random access resource configuration or have different random access resource configurations.

In one exemplary embodiment, the other physical layer parameters include at least one of or any combination of: a downlink subframe configuration, a downlink transmission gap configuration, a size of evolved universal terrestrial radio access (E-UTRA) control region in an in-band operation mode.

In an exemplary embodiment, the device further includes: the broadcasting module is further configured to broadcast a difference between a RSRP threshold for radio coverage level list for the non-anchor carriers and a RSRP threshold for radio coverage level list for anchor carriers to the terminal.

An embodiment of the present disclosure further includes a system for obtaining a network system resource configuration, which includes:

the device for obtaining a network system resource configuration described above and the device for transmitting the network system resource configuration described above. The embodiment of the present disclosure further provides a terminal. The terminal includes a processor and a memory storing instructions executable by the processor. The instructions, when executed by the processor, execute the following operations:

receiving, a non-anchor carrier configuration broadcast by a network device, where the non-anchor carrier configuration includes at least one of or any combination of: a non-anchor carrier frequency point list, a non-anchor carrier configuration parameter list, an uplink non-anchor carrier frequency point list, an uplink non-anchor carrier configuration parameter list, a downlink non-anchor carrier frequency point list and a downlink non-anchor carrier configuration parameter list; and determining, according to the non-anchor carrier configuration, resource information for performing random access or monitoring pages with the network device.

In one exemplary embodiment, the non-anchor carrier configuration further includes at least one of or any combination of:

a random access resource configuration list for non-anchor carriers, a RSRP threshold for radio coverage level list for the non-anchor carriers and a RSRP threshold for radio coverage level list for downlink non-anchor carriers.

In one exemplary embodiment, the non-anchor carrier configuration further includes at least one of or any combination of:

a paging parameter configuration list for the non-anchor carriers and a paging parameter configuration list for the downlink non-anchor carriers.

In one exemplary embodiment, the non-anchor carrier configuration further includes at least one of or any combination of:

an indication configured for each non-anchor carrier and indicating whether the non-anchor carrier is available for random access;

an indication configured for each non-anchor carrier and indicating whether the non-anchor carrier is available for monitoring pages; and an indication configured for each non-anchor carrier and indicating whether the non-anchor carrier is available for monitoring and receiving a physical downlink control channel (PDCCH) channel.

The non-anchor carrier includes any one of: the non-anchor carrier, an uplink non-anchor carrier and a downlink non-anchor carrier.

In one exemplary embodiment, for a non-anchor carrier configured to be available for monitoring pages, the non-anchor carrier configuration further includes at least one of or any combination of:

a paging parameter configuration list for the non-anchor carriers and a paging parameter configuration list for the downlink non-anchor carriers.

In one exemplary embodiment, the paging parameter configuration list further includes at least one of or any combination of:

a carrier selection weighting factor shared by the non-anchor carriers or a carrier selection weighting factor separately configured for each non-anchor carrier;

a discontinuous reception (DRX) period shared by the non-anchor carriers or a DRX period separately configured for each non-anchor carrier;

a number of paging opportunities per DRX period shared by the non-anchor carriers or a number of paging opportunities per DRX period separately configured for each non-anchor carrier; and a non-anchor carrier frequency band feature parameter configured for each non-anchor carrier.

The non-anchor carrier includes any one of: the non-anchor carrier and the downlink non-anchor carrier.

In one exemplary embodiment, the instructions further execute the following operations:

receiving a random access carrier configuration corresponding to each radio coverage level, where the random access carrier configuration is broadcast by the network device. The random access carrier configuration further includes at least one of or any combination of: a carrier frequency point, a carrier frequency point list, an anchor carrier frequency point, an anchor carrier frequency point list, the non-anchor carrier frequency point, the non-anchor carrier frequency point list, an uplink non-anchor carrier frequency point, the uplink non-anchor carrier frequency point list, a carrier sequence number, a carrier sequence number list, an anchor carrier sequence number, an anchor carrier sequence number list, a non-anchor carrier sequence number, a non-anchor carrier sequence number list, an uplink non-anchor carrier frequency point sequence number, an uplink non-anchor carrier frequency point sequence number list, random access resource configurations corresponding to the above frequency points or frequency point lists. The carrier frequency point includes the anchor carrier frequency point and the non-anchor carrier frequency point, and the carrier frequency point list includes the anchor carrier frequency point list and the non-anchor carrier frequency point list.

In one exemplary embodiment, the instructions further execute the following operations:

receiving a paging carrier configuration corresponding to each radio coverage level, where the paging carrier configuration is broadcast by the network device. The paging carrier configuration further includes at least one of or any combination of: a carrier frequency point, a carrier frequency point list, an anchor carrier frequency point, an anchor carrier frequency point list, the non-anchor carrier frequency point, the non-anchor carrier frequency point list, a downlink non-anchor carrier frequency point, the downlink non-anchor carrier frequency point list, a carrier sequence number, a carrier sequence number list, an anchor carrier sequence number, an anchor carrier sequence number list, a non-anchor carrier sequence number, a non-anchor carrier sequence number list, a downlink non-anchor carrier frequency point sequence number, a downlink non-anchor carrier frequency point sequence number list, the paging resource configurations corresponding to the above frequency points or frequency point lists. The carrier frequency point includes the anchor carrier frequency point and the non-anchor carrier frequency point, and the carrier frequency point list includes the anchor carrier frequency point list and the non-anchor carrier frequency point list.

In one exemplary embodiment, the paging carrier configuration further includes at least one of or any combination of:

a carrier selection weighting factor shared by the non-anchor carriers or a carrier selection weighting factor separately configured for each non-anchor carrier;

a discontinuous reception (DRX) period shared by the non-anchor carriers or a DRX period separately configured for each non-anchor carrier;

a number of paging opportunities per DRX period shared by the non-anchor carriers or a number of paging opportunities per DRX period separately configured for each non-anchor carrier; and a non-anchor carrier frequency band feature parameter configured for each non-anchor carrier.

The non-anchor carrier includes any one of: the non-anchor carrier and the downlink non-anchor carrier.

In one exemplary embodiment, the carrier feature parameter includes at least one of a guard band, an in-band and a standalone band.

In one exemplary embodiment, the instructions further execute the following operations:

obtaining first indication information broadcast by the network device, where the first indication information is used for instructing the terminal to monitor pages through a first non-anchor carrier, or a first downlink non-anchor carrier, or the first non-anchor carrier and the first downlink non-anchor carrier; or obtaining third indication information broadcast by the network device, where the third indication information is used for instructing the terminal to monitor pages through a first anchor carrier; or obtaining fifth indication information broadcast by the network device, where the fifth indication information is used for instructing the terminal to monitor pages through the first anchor carrier, the first non-anchor carrier, or the first downlink non-anchor carrier, where the first non-anchor carrier includes at least one non-anchor carrier in the non-anchor carrier configuration, the first downlink non-anchor carrier includes at least one downlink anchor carrier in the non-anchor carrier configuration, and the first anchor carrier includes at least one anchor carrier in an anchor carrier list broadcast by a system; or obtaining seventh indication information broadcast by the network device, where the seventh indication information is used for indicating whether resources used by the terminal for monitoring pages include the anchor carrier.

In one exemplary embodiment, the instructions further execute the following operations: obtaining second indication information broadcast by the network device, where the second indication information is used for instructing the terminal to perform the random access through a second non-anchor carrier, or a second uplink non-anchor carrier, or the second non-anchor carrier and the second uplink non-anchor carrier; or obtaining fourth indication information broadcast by the network device, where the fourth indication information is used for instructing the terminal to perform the random access through a second anchor carrier; or obtaining sixth indication information broadcast by the network device, where the sixth indication information is used for instructing the terminal to perform the random access through the second anchor carrier, the second non-anchor carrier, or the second uplink non-anchor carrier, where the second non-anchor carrier includes at least one non-anchor carrier in the non-anchor carrier configuration or the random access carrier configuration, the second uplink non-anchor carrier includes at least one uplink non-anchor carrier in the non-anchor carrier configuration or the random access carrier configuration, and the second anchor carrier includes at least one anchor carrier in an anchor carrier list broadcast by the network device; or obtaining eighth indication information broadcast by the network device, where the eighth indication information is used for indicating whether resources for performing the random access used by the terminal include the anchor carrier.

In one exemplary embodiment, the instructions further execute the following operations: receiving a carrier configuration corresponding to each radio coverage level and broadcast by the network device, where the carrier configuration is monitored for receiving the PDCCH channel. The carrier configuration monitored for receiving the PDCCH channel at least includes one of or any combination of: a carrier frequency point, a carrier frequency point list, an anchor carrier frequency point, an anchor carrier frequency point list, the non-anchor carrier frequency point, the non-anchor carrier frequency point list, a downlink non-anchor carrier frequency point, a downlink non-anchor carrier frequency point list, a carrier sequence number, a carrier sequence number list, an anchor carrier sequence number, an anchor carrier sequence number list, a non-anchor carrier sequence number, a non-anchor carrier sequence number list, a downlink non-anchor carrier frequency point sequence number, a downlink non-anchor carrier frequency point sequence number list. The carrier frequency point includes the anchor carrier frequency point and the non-anchor carrier frequency point, and the carrier frequency point list includes the anchor carrier frequency point list and the non-anchor carrier frequency point list.

In one exemplary embodiment, the instructions further execute the following operations:

when the terminal selects an ith carrier in a random access carrier configuration to initiate the random access, determining, according to a preset algorithm, to select a jth carrier to monitor and receive a PDCCH channel in a carrier configuration monitored for receiving the PDCCH channel.

In one exemplary embodiment, the preset algorithm further includes:

$$j = \begin{cases} Npd/i, & \text{if } Npd > Npa \\ (i \bmod Npd) + 1, & \text{if } Npd \leq Npa \end{cases}$$

Npd is a total number of carriers in the carrier configuration monitored for receiving the PDCCH channel, Npa is a total number of the carriers in the random access carrier configuration, and a minimum value of i and a minimum value of j are 1.

In one exemplary embodiment, the preset algorithm further includes:

$j=(i+N_{offset})$ mod Npd, where $N_{offset}$ is a preset value or a constant, Npd is a total number of carriers in the carrier configuration monitored for receiving the PDCCH channel, Npa is a total number of the carriers in the random access carrier configuration, and a minimum value of i and a minimum value of j are 1.

In one exemplary embodiment, the preset algorithm further includes:

in response to determining that Npd=Npa, j=i, in response to determining that Npd≠Npa, j=(i+$N_{offset}$) mod Npd, and $N_{offset}$ is a preset value or a constant. Npd is a total number of carriers in the carrier configuration monitored for receiving the PDCCH channel, Npa is a total number of the carriers in the random access carrier configuration, and a minimum value of i and a minimum value of j are 1.

In one exemplary embodiment, the preset algorithm further includes:

in response to determining that Npd=Npa, j=i, in response to determining that Npd≠Npa, j=, Npd is a total number of carriers in the carrier configuration monitored for receiving the PDCCH channel, Npa is a total number of the carriers in the random access carrier configuration, and a minimum value of i and a minimum value of j are 1.

In one exemplary embodiment, the instructions further execute the following operations:

receiving information broadcast by the network device and on a correspondence between a carrier configuration monitored for receiving the PDCCH channel and an uplink carrier configuration corresponding to any one of: each non-anchor carrier and each radio coverage level.

The uplink carrier configuration includes at least one of or any combination of: a carrier frequency point, a carrier frequency point list, an anchor carrier frequency point, an anchor carrier frequency point list, a non-anchor carrier frequency point, the non-anchor carrier frequency point list, an uplink non-anchor carrier frequency point, the uplink non-anchor carrier frequency point list, a carrier sequence number, a carrier sequence number list, an anchor carrier sequence number, an anchor carrier sequence number list, a non-anchor carrier sequence number, a non-anchor carrier sequence number list, an uplink non-anchor carrier frequency point sequence number, an uplink non-anchor carrier frequency point sequence number list.

The carrier configuration monitored for receiving the PDCCH channel includes at least one of or any combination of: the carrier frequency point, the carrier frequency point list, the anchor carrier frequency point, the anchor carrier frequency point list, the non-anchor carrier frequency point, the non-anchor carrier frequency point list, a downlink non-anchor carrier frequency point, a downlink non-anchor carrier frequency point list, the carrier sequence number, the carrier sequence number list, the anchor carrier sequence number, the anchor carrier sequence number list, the non-anchor carrier sequence number, the non-anchor carrier sequence number list, a downlink non-anchor carrier frequency point sequence number, a downlink non-anchor carrier frequency point sequence number list.

In one exemplary embodiment, according to the correspondence, in response to determining that the terminal selects a certain uplink carrier to initiate the random access, the carrier configuration having the correspondence with the certain uplink carrier and monitored for receiving the PDCCH channel is selected to monitor and receive the PDCCH channel. The correspondence includes at least one of or any combination of:

a correspondence in which one uplink carrier configuration corresponds to one carrier configuration monitored for receiving the PDCCH channel;

a correspondence in which one uplink carrier configuration corresponds to multiple carrier configurations monitored for receiving the PDCCH channel, where the multiple carrier configurations monitored for receiving the PDCCH channel are represented in a Bitmap, in which a preset value 1 represents a carrier corresponding to the uplink carrier configuration and a preset value 2 represents a carrier not corresponding to the uplink carrier configuration;

a correspondence in which multiple uplink carrier configurations correspond to one carrier configuration monitored for receiving the PDCCH channel, where the multiple uplink carrier configurations are represented in a Bitmap, in which a preset value 1 represents a carrier corresponding to the carrier configuration monitored for receiving the PDCCH channel and a preset value 2 represents a carrier not corresponding to the carrier configuration monitored for receiving the PDCCH channel.

In one exemplary embodiment, the instructions further execute the following operations:

when the terminal selects an ith carrier to initiate the random access in the uplink access carrier configuration, determining, according to a preset algorithm, to select a jth carrier to monitor and receive a PDCCH channel in the carrier configuration monitored for receiving the PDCCH channel and having the correspondence.

In one exemplary embodiment, the preset algorithm further includes:

if Npd=Npa, j=i, if Npd≠Npa, j=(i+k0*Ns) mod Npd+N0.

Npd is a total number of carriers in the carrier configuration monitored for receiving the PDCCH channel and having the correspondence, Npa is a total number of the carriers in the random access carrier configuration, or the Npa is a total number of the carriers in the uplink carrier configuration having the correspondence, Ns is a subcarrier identity factor of the ith carrier in the random access carrier configuration or a function of the subcarrier identity factor, or Ns is a current coverage level factor of the terminal or a function input of the current coverage level factor, k0 and N0 are preset constants.

In one exemplary embodiment, the preset algorithm further includes:

if Npd=Npa, j=i, if Npd≠Npa, effective values of Ns on the ith carrier are divided into Npd segments, and the Npd segments are identified as M1, M2, . . . MNpd in an ascending order. In response to determining that the terminal initiates the random access on the ith carrier, the carrier monitored for receiving the PDCCH channel is selected according to which one of the Npd segments the value of Ns in a selected random access resource falls into. For example, the value of Ns in the selected random access resource falls into a Mjth segment, the jth carrier is selected as the carrier monitored for receiving the PDCCH channel.

Npd is a total number of carriers in the carrier configuration monitored for receiving the PDCCH channel and having the correspondence, Npa is a total number of the carriers in the random access carrier configuration, or the Npa is a total number of the carriers in the uplink carrier configuration, Ns is a subcarrier identity factor in the random access carrier configuration or a function of the subcarrier identity factor, or Ns is a current coverage level factor of the terminal or a function of the current coverage level factor.

In one exemplary embodiment, the preset algorithm further includes:

if Npd=Npa, j=i, if Npd≠Npa, j=(i+k1*T) mod Npd+N1,

Npd is a total number of carriers in the carrier configuration monitored for receiving the PDCCH channel and having the correspondence, Npa is a total number of the carriers in the random access carrier configuration, or the Npa is a total number of the carriers in the uplink carrier configuration, T is a time domain factor, and k1 and N1 are preset constants.

In one exemplary embodiment, the time domain factor includes at least one of: a sequence number of a first radio frame in the selected random access resource, a number of a first radio subframe serial in the selected random access resource, a sequence number of a first radio frame transmitting a random access preamble, and a sequence number of a first radio subframe serial transmitting the random access preamble.

In one exemplary embodiment, N0=1, N1=1, k0 is a maximum value of i, k1 is the maximum value of i, and the minimum value of i and the minimum value of j are 1.

The embodiment of the present disclosure further provides a network device, which includes a processor and a memory storing instructions executable by the processor. The instructions, when executed by the processor, execute following operations:

determining, a non-anchor carrier configuration to be broadcast to a terminal, where the non-anchor carrier configuration includes at least one of or any combination of: a non-anchor carrier frequency point list, a non-anchor carrier configuration parameter list, an uplink non-anchor carrier frequency point list, an uplink non-anchor carrier configuration parameter list, a downlink non-anchor carrier frequency point list and a downlink non-anchor carrier configuration parameter list; and broadcasting the non-anchor carrier configuration to the terminal.

In one exemplary embodiment, the non-anchor carrier configuration further includes at least one of or any combination of:

a random access resource configuration list for non-anchor carriers, a radio coverage level reference signal receiving power (RSRP) threshold list for the non-anchor carriers and a radio coverage level RSRP threshold list for downlink non-anchor carriers.

In one exemplary embodiment, the instructions further execute the following operations:

broadcasting a random access carrier configuration corresponding to each radio coverage level to the terminal, where the random access carrier configuration further includes at least one of or any combination of: a carrier frequency point, a carrier frequency point list, an anchor carrier frequency point, an anchor carrier frequency point list, a non-anchor carrier frequency point, the non-anchor carrier frequency point list, an uplink non-anchor carrier frequency point, the uplink non-anchor carrier frequency point list, a carrier sequence number, a carrier sequence number list, an anchor carrier sequence number, an anchor carrier sequence number list, a non-anchor carrier sequence number, a non-anchor carrier sequence number list, an uplink non-anchor carrier frequency point sequence number, an uplink non-anchor carrier frequency point sequence number list, and random access resource configurations corresponding to the above frequency points or frequency point lists. The carrier frequency point includes the anchor carrier frequency point and the non-anchor carrier frequency point, and the carrier frequency point list includes the anchor carrier frequency point list and the non-anchor carrier frequency point list.

In one exemplary embodiment, the following operations are further executed:

broadcasting first indication information to the terminal, where the first indication information is used for instructing the terminal to monitor pages through a first non-anchor carrier, or a first downlink non-anchor carrier, or the first non-anchor carrier and the first downlink non-anchor carrier; or broadcasting third indication information to the terminal, where the third indication information is used for instructing the terminal to monitor pages through a first anchor carrier; or broadcasting fifth indication information to the terminal, where the fifth indication information is used for instructing the terminal to monitor pages through the first anchor carrier, the first non-anchor carrier, or the first downlink non-anchor carrier, where the first non-anchor carrier includes at least one non-anchor carrier in the non-anchor carrier configuration, the first downlink non-anchor carrier includes at least one downlink non-anchor carrier in the non-anchor carrier configuration, and the first anchor carrier includes at least one anchor carrier in an anchor carrier list broadcast by a system; or broadcasting, by the network device, seventh indication information to the terminal, where the seventh indication information is used for indicating whether resources used by the terminal for monitoring pages include the anchor carrier.

In one exemplary embodiment, the following operations are further executed:

broadcasting second indication information to the terminal, where the second indication information is used for instructing the terminal to perform the random access through a second non-anchor carrier, or a second uplink non-anchor carrier, or the second non-anchor carrier and the second uplink non-anchor carrier; or broadcasting fourth indication information to the terminal, where the fourth indication information is used for instructing the terminal to perform the random access through a second anchor carrier; or broadcasting sixth indication information to the terminal, where the sixth indication information is used for instructing the terminal to perform the random access though the second anchor carrier, the second non-anchor carrier, or the second uplink non-anchor carrier, where the second non-anchor carrier includes at least one non-anchor carrier in the non-anchor carrier configuration or the random access carrier configuration, the second uplink non-anchor carrier includes at least one uplink non-anchor carrier in the non-anchor carrier configuration or the random access carrier configuration, the second anchor carrier includes at least one anchor carrier in an anchor carrier list broadcast by the network device; or broadcasting eighth indication information to the terminal, where the eighth indication information is used for indicating whether resources for performing the random access used by the terminal include the anchor carrier.

In one exemplary embodiment, the following operations are further executed: broadcasting to the terminal a carrier configuration monitored for receiving a PDCCH channel corresponding to each radio coverage level. The carrier configuration monitored for receiving the PDCCH channel at least includes one of or any combination of: a carrier frequency point, a carrier frequency point list, an anchor carrier frequency point, an anchor carrier frequency point list, the non-anchor carrier frequency point, the non-anchor carrier frequency point list, a downlink non-anchor carrier frequency point, a downlink non-anchor carrier frequency point list, a carrier sequence number, a carrier sequence number list, an anchor carrier sequence number, an anchor carrier sequence number list, a non-anchor carrier sequence number, a non-anchor carrier sequence number list, a downlink non-anchor carrier frequency point sequence number, a downlink non-anchor carrier frequency point sequence number list. The carrier frequency point includes the anchor carrier frequency point and the non-anchor carrier frequency point, and the carrier frequency point list includes the anchor carrier frequency point list and the non-anchor carrier frequency point list.

In one exemplary embodiment, each item of each of the non-anchor carrier configuration parameter list, the uplink non-anchor carrier configuration parameter list, and the downlink non-anchor carrier configuration parameter list includes: other physical layer parameters.

In one exemplary embodiment, the random access resource configuration list for the non-anchor carriers at least includes an item of the random access resource configuration corresponding to a radio coverage level.

An embodiment of the present disclosure further provides a network system, which includes:

the terminal described above and the network device described above.

In the embodiments of the present disclosure, a terminal receives a non-anchor carrier configuration broadcast by a network device, and determines, according to the non-anchor carrier configuration, resource information for performing random access or monitoring pages with the network device. The non-anchor carrier configuration includes at least one of or any combination of a non-anchor carrier frequency point list, a non-anchor carrier configuration parameter list, an uplink non-anchor carrier frequency point list, an uplink non-anchor carrier configuration parameter list, a downlink non-anchor carrier frequency point list and a downlink non-anchor carrier configuration parameter list. In this way, the terminal can perform the random access and monitoring pages on the non-anchor carrier, thereby improving the ability of the paging and random access capacity of the network device.

The above is a summary of the subject matter described herein in detail. This summary is not intended to limit the scope of the claims. Other aspects can be understood after the drawings and detailed description are read and understood.

DETAILED DESCRIPTION

A method for obtaining a network system resource configuration and a method for transmitting the network system resource configuration provided by embodiments of the present disclosure may be applied when a network device and a terminal perform monitoring pages or random access through a non-anchor carrier. The method for obtaining the network system resource configuration provided by embodiments of the present disclosure may be executed by a device for obtaining the network system resource configuration, which may be integrated in a terminal device or provided separately. The method for transmitting the network system resource configuration provided by embodiments of the present disclosure may be executed by a device for transmitting the network system resource configuration, which may be integrated in the network device or provided separately. The device for obtaining the network system resource configuration and the device for transmitting the network system resource configuration may be implemented by software, hardware, or a combination thereof.

Figure 1:
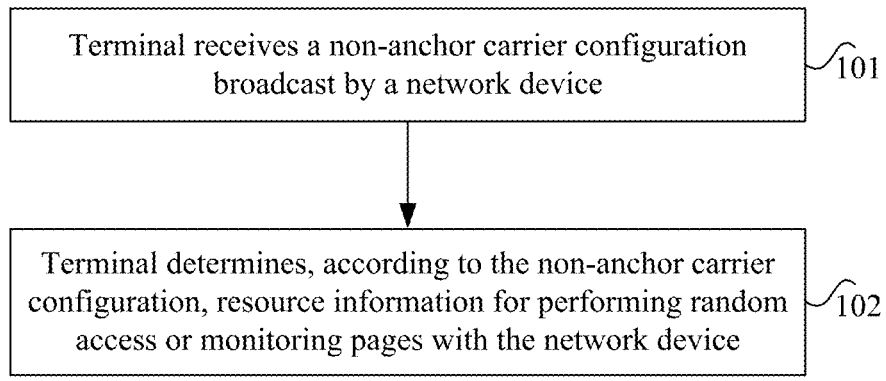
FIG. 1 is a flowchart of a method for obtaining a network system resource configuration according to an embodiment of the present disclosure.

FIG. 1 is a flowchart of a method for obtaining a network system resource configuration according to an embodiment of the present disclosure. The method may be executed by a terminal. As shown in FIG. 1, the method includes steps 101 and 102.

In step 101, the terminal receives a non-anchor carrier configuration broadcast by a network device.

In this embodiment, the non-anchor carrier configuration includes at least one of or any combination of: a non-anchor carrier frequency point list, a non-anchor carrier configuration parameter list, an uplink non-anchor carrier frequency point list, an uplink non-anchor carrier configuration parameter list, a downlink non-anchor carrier frequency point list and a downlink non-anchor carrier configuration parameter list.

This embodiment is used in such a usage scenario in which multiple single-carrier cells in a same area under a same network device, such as a base station, are aggregated into a multi-carrier cell.

In this embodiment, the non-anchor carrier frequency point list includes at least one non-anchor carrier frequency point. The network device may be the base station or any device of a network system. The terminal may be any terminal device connected with the network device.

The non-anchor carrier configuration parameter list may include at least two implementation modes.

In a first implementation mode, the non-anchor carrier configuration parameter list may include at least one item, and each item includes different configuration parameters, such as power and interval time. In this disclosure, the configuration parameters in each item are not limited to the power and interval time, and may further include the configuration parameter configured by those skilled in the art.

In a second implementation mode, the non-anchor carrier configuration parameter list may include at least one item, and each item includes one configuration parameter. For example, the non-anchor carrier configuration parameter list may include two items, where one item is a power, and the other item is interval time.

In one exemplary embodiment, the non-anchor carrier frequency point list and the non-anchor carrier configuration parameter list may be configured in the same list. That is, each non-anchor carrier frequency point in the non-anchor carrier frequency point list may correspond to one configuration parameter list items in the non-anchor carrier configuration parameter list. Alternatively, all non-anchor carrier frequency points in the non-anchor carrier frequency point list may correspond to one configuration parameter list item in the non-anchor carrier configuration parameter list.

In step 102, the terminal determines, according to the non-anchor carrier configuration, resource information for performing random access or monitoring pages with the network device.

The step in which the terminal determines according to the non-anchor carrier configuration the resource information for performing the random access or monitoring pages with the network device at least includes two implementation modes.

In the first implementation mode, the terminal may determine the resource information for monitoring pages with the network device according to the non-anchor carrier frequency point list, the non-anchor carrier configuration parameter list, the downlink non-anchor carrier frequency point list and the downlink non-anchor carrier configuration parameter list indicated in the non-anchor carrier configuration, thereby initiating monitoring pages on the resource information.

In the second implementation mode, the terminal may determine the resource information for performing the random access with the network device according to the non-anchor carrier frequency point list, the non-anchor carrier configuration parameter list, the uplink non-anchor carrier frequency point list and the uplink non-anchor carrier configuration parameter list indicated in the non-anchor carrier configuration, thereby initiating the random access on the resource information.

In this embodiment, the terminal receives the non-anchor carrier configuration broadcast by the network device. The non-anchor carrier configuration includes at least one of or any combination of: the non-anchor carrier frequency point list, the non-anchor carrier configuration parameter list, the uplink non-anchor carrier frequency point list, the uplink non-anchor carrier configuration parameter list, the downlink non-anchor carrier frequency point list and the downlink non-anchor carrier configuration parameter list. The terminal determines, according to the non-anchor carrier configuration, the resource information for performing the random access or monitoring pages with the network device. In this way, the terminal performs the random access and monitoring pages on the non-anchor carrier, thereby improving the ability of the paging and random access capacity of the network device.

In one exemplary embodiment, the non-anchor carrier configuration further includes at least one of or any combination of: a random access resource configuration list for non-anchor carriers, a reference signal receiving power (RSRP) threshold for radio coverage level list for the non-anchor carriers and a RSRP threshold for radio coverage level list for downlink non-anchor carriers.

The random access resource configuration list for the non-anchor carriers at least includes one random access resource configuration item. Each random access resource configuration item includes a correspondence relationship between the non-anchor carrier frequency points and the radio coverage levels. For example, a first radio coverage level corresponds to three non-anchor carrier frequency points, i.e., F1, F2 and F5, and a second radio coverage level corresponds to two non-anchor carrier frequency points, i.e., F3 and F4.

In this embodiment, the RSRP threshold for radio coverage level list for the non-anchor carriers may at least include a non-anchor carrier radio coverage level RSRP threshold item. Each non-anchor carrier radio coverage level RSRP threshold item includes a correspondence relationship between RSRP thresholds and the radio coverage levels. For example, the RSRP which is greater than a first RSRP threshold, i.e., 800 HZ, corresponds to a first non-anchor carrier radio coverage level, and the RSRP which is less than the first RSRP threshold and greater than a second RSRP threshold, i.e., 500 HZ, corresponds to a second non-anchor carrier radio coverage level. In this embodiment, the RSRP threshold list for the downlink non-anchor carrier at least includes a downlink non-anchor carrier RSRP threshold item. Each downlink non-anchor carrier RSRP threshold item includes a correspondence relationship between the RSRP threshold and a downlink radio coverage level. For example, the RSRP which is greater than the first RSRP threshold, i.e., 800 HZ, corresponds to a first downlink radio coverage level and the RSRP which is less than the first RSRP threshold and greater than the second RSRP threshold, i.e., 500 HZ, corresponds to a second downlink radio coverage level.

In one exemplary embodiment, the non-anchor carrier configuration further includes at least one of or any combination of:

a paging parameter configuration list for the non-anchor carrier and a paging parameter configuration list for the downlink non-anchor carrier.

In one exemplary embodiment, the non-anchor carrier configuration further includes at least one of or any combination of:

an indication configured for each non-anchor carrier and indicating whether the non-anchor carrier is available for random access;

an indication configured for each non-anchor carrier and indicating whether the non-anchor carrier is available for monitoring pages; and an indication configured for each non-anchor carrier and indicating whether the non-anchor carrier is available for monitoring and receiving a physical downlink control channel (PDCCH).

The non-anchor carriers include any one of: the non-anchor carrier, the uplink non-anchor carrier and the downlink non-anchor carrier.

For the non-anchor carrier configured to be available for monitoring pages, the non-anchor carrier configuration further includes at least one of or any combination of:

the paging parameter configuration list for the non-anchor carrier and the paging parameter configuration list for the downlink non-anchor carrier.

In one exemplary embodiment, the paging parameter configuration list further includes at least one of or any combination of:

a carrier selection weighting factor shared by the non-anchor carriers or a carrier selection weighting factor separately configured for each non-anchor carrier;

a discontinuous reception (DRX) period shared by the non-anchor carriers or a DRX period separately configured for each non-anchor carrier;

a number of paging opportunities per DRX period shared by the non-anchor carriers or a number of paging opportunities over DRX period separately configured for each non-anchor carrier; and a non-anchor carrier frequency band feature parameter configured for each non-anchor carrier.

The non-anchor carrier includes any one of: the non-anchor carrier and the downlink non-anchor carrier.

In an exemplary embodiment, the method may further include:

the terminal receives each radio coverage level's corresponding random access carrier configuration broadcast by the network device. The random access carrier configuration further includes at least one of or any combination of: a carrier frequency point, a carrier frequency point list, an anchor carrier frequency point, an anchor carrier frequency point list, a non-anchor carrier frequency point, the non-anchor carrier frequency point list, an uplink non-anchor carrier frequency point, the uplink non-anchor carrier frequency point list, a carrier sequence number, a carrier sequence number list, an anchor carrier sequence number, an anchor carrier sequence number list, a non-anchor carrier sequence number, a non-anchor carrier sequence number list, an uplink non-anchor carrier frequency point sequence number, an uplink non-anchor carrier frequency point sequence number list, and random access resource configurations corresponding to the above frequency points or frequency point lists, where the carrier frequency point includes the anchor carrier frequency point and the non-anchor carrier frequency point, and the carrier frequency point list includes the anchor carrier frequency point list and the non-anchor carrier frequency point list.

In an exemplary embodiment, the method may further include:

the terminal receives each radio coverage level's corresponding paging carrier configuration broadcast by the network device. The paging carrier configuration further includes at least one of or any combination of: a carrier frequency point, a carrier frequency point list, an anchor carrier frequency point, an anchor carrier frequency point list, a non-anchor carrier frequency point, the non-anchor carrier frequency point list, a downlink non-anchor carrier frequency point, the downlink non-anchor carrier frequency point list, a carrier sequence number, a carrier sequence number list, an anchor carrier sequence number, an anchor carrier sequence number list, a non-anchor carrier sequence number, a non-anchor carrier sequence number list, a downlink non-anchor carrier frequency point sequence number, a downlink non-anchor carrier frequency point sequence number list, and paging resource configurations corresponding to the above frequency points or frequency point lists. The carrier frequency point comprises the anchor carrier frequency point and the non-anchor carrier frequency point, and the carrier frequency point list comprises the anchor carrier frequency point list and the non-anchor carrier frequency point list.

The paging carrier configuration further includes at least one of or any combination of:

a carrier selection weighting factor shared by the non-anchor carriers or a carrier selection weighting factor separately configured for each non-anchor carrier;

a DRX period shared by the non-anchor carriers or a DRX period separately configured for each non-anchor carrier;

a number of paging opportunities per DRX period shared by the non-anchor carriers or a number of paging opportunities per DRX period separately configured the each non-anchor carrier; and a non-anchor carrier frequency band feature parameter configured for each non-anchor carrier.

The non-anchor carrier includes any one of: the non-anchor carrier and the downlink non-anchor carrier.

The carrier feature parameter includes one of: a guard band, an in-band and a standalone band.

In an exemplary embodiment, the method may further include: the terminal obtains first indication information broadcast by the network device, where the first indication information is used for instructing the terminal to monitor pages on a first non-anchor carrier, or a first downlink non-anchor carrier, or the first non-anchor carrier and the first downlink non-anchor carrier.

Alternatively, the terminal obtains third indication information broadcast by the network device, where the third indication information is used for instructing the terminal to monitor pages through a first anchor carrier.

Alternatively, the terminal obtains fifth indication information broadcast by the network device, where the fifth indication information is used for instructing the terminal to monitor pages through the first anchor carrier, the first non-anchor carrier, or the first downlink non-anchor carrier. The first non-anchor carrier includes at least one non-anchor carrier in the non-anchor carrier configuration, the first downlink non-anchor carrier includes at least one downlink non-anchor carrier in the non-anchor carrier configuration, and the first anchor carrier includes at least one anchor carrier in an anchor carrier list broadcast by a system.

Alternatively, the terminal obtains seventh indication information broadcast by the network device, where the seventh indication information is used for indicating whether resources used by the terminal for monitoring pages include the anchor carrier.

It is to be noted that the terminal receives at least one of or any combination of: the first indication information broadcast, the third indication information and the fifth indication information which are broadcast by the network device in at least two implementation modes. In the first implementation mode, the network device transmits these indication information by directly using bits. In the second implementation mode, the network device transmits these indication information in an implicit mode, that is, without using bit.

No matter the network device transmits the indication information in which implementation mode, the method in the embodiment of the present disclosure may further include:

the terminal obtains second indication information broadcast by the network device, where the second indication information is used for instructing the terminal to perform the random access on a second non-anchor carrier, or a second uplink non-anchor carrier, or the second non-anchor carrier and the second uplink non-anchor carrier.

Alternatively, the terminal obtains fourth indication information broadcast by the network device, where the fourth indication information is used for instructing the terminal to perform the random access by a second anchor carrier.

Alternatively, the terminal obtains sixth indication information broadcast by the network device, where the sixth indication information is used for instructing the terminal to perform the random access on the second anchor carrier, the second non-anchor carrier, or the second uplink non-anchor carrier. The second non-anchor carrier includes at least one non-anchor carrier in the non-anchor carrier configuration or the random access carrier configuration, the second uplink non-anchor carrier includes at least one uplink non-anchor carrier in the non-anchor carrier configuration or the random access carrier configuration, and the second anchor carrier includes at least one anchor carrier in an anchor carrier list broadcast by the network device.

Alternatively, the terminal obtains eighth indication information broadcast by the network device, where the eighth indication information is used for indicating whether resources for performing the random access used by the terminal include the anchor carrier.

It is to be noted that the terminal receives at least one of or any combination of: the second indication information broadcast, the fourth indication information and the sixth indication information broadcast by the network device in at least two implementation modes. In the first implementation mode, the network device transmits these indication information by directly using bits. In the second implementation mode, the network device transmits these indication information in an implicit mode, that is, without using bit.

The method of this embodiment further includes: the terminal receives each radio coverage level's corresponding carrier configuration broadcast by the network device, where carrier configuration is monitored for receiving the PDCCH channel. The carrier configuration monitored for receiving the PDCCH channel at least includes one of or any combination of: a carrier frequency point, a carrier frequency point list, an anchor carrier frequency point, an anchor carrier frequency point list, the non-anchor carrier frequency point, the non-anchor carrier frequency point list, a downlink non-anchor carrier frequency point, a downlink non-anchor carrier frequency point list, a carrier sequence number, a carrier sequence number list, an anchor carrier sequence number, an anchor carrier sequence number list, a non-anchor carrier sequence number, a non-anchor carrier sequence number list, a downlink non-anchor carrier frequency point sequence number, and a downlink non-anchor carrier frequency point sequence number list. The carrier frequency point comprises the anchor carrier frequency point and the non-anchor carrier frequency point, and the carrier frequency point list comprises the anchor carrier frequency point list and the non-anchor carrier frequency point list.

The terminal may determine according to a preset algorithm to select a jth carrier to listen and receive the PDCCH channel in the carrier configuration monitored for receiving the PDCCH channel when the terminal selects an ith carrier to initiate the random access in the random access carrier configuration.

For example, the preset algorithm includes:

$$j = \begin{cases} Npd/i, & \text{if } Npd > Npa \\ (i \bmod Npd) + 1, & \text{if } Npd \leq Npa \end{cases}$$

Npd is a total number of carriers in the carrier configuration monitored for receiving the PDCCH channel, Npa is a total number of the carriers in the random access carrier configuration, and a minimum value of i and a minimum value of j are 1.

The preset algorithm may be implemented in any mode described below.

In the first implementation mode, the preset algorithm includes:

$j=(i+N_{offset})$ mod Npd, where $N_{offset}$ is a preset value or a constant, Npd is a total number of carriers in the carrier configuration monitored for receiving the PDCCH channel, Npa is a total number of the carriers in the random access carrier configuration, and a minimum value of i and a minimum value of j are 1.

In the second implementation mode, the preset algorithm includes:

if Npd=Npa, let j=i, if Npd≠Npa, let $j=(i+N_{offset})$ mod Npd, and $N_{offset}$ is a preset value or a constant. Npd is a total number of carriers in the carrier configuration monitored for receiving the PDCCH channel, Npa is a total number of the carriers in the random access carrier configuration, and a minimum value of i and a minimum value of j are 1.

In the third implementation mode, the preset algorithm includes:

if Npd=Npa, let j=i,
if Npd≠Npa, let $$j = \begin{cases} Npd/i, & \text{if } Npd > Npa \\ (i \bmod Npd) + 1, & \text{if } Npd < Npa \end{cases}$$

Npd is a total number of carriers in the carrier configuration monitored for receiving the PDCCH channel, Npa is a total number of the carriers in the random access carrier configuration, and a minimum value of i and a minimum value of j are 1.

In an exemplary embodiment, the method may further include:

the terminal receives information on a correspondence between the carrier configuration monitored for receiving the PDCCH channel and an uplink carrier configuration corresponding to any one of: each non-anchor carrier and each radio coverage level. The information is broadcast by the network device.

The uplink carrier configuration includes at least one of or any combination of: a carrier frequency point, a carrier frequency point list, an anchor carrier frequency point, an anchor carrier frequency point list, a non-anchor carrier frequency point, the non-anchor carrier frequency point list, an uplink non-anchor carrier frequency point, the uplink non-anchor carrier frequency point list, a carrier sequence number, a carrier sequence number list, an anchor carrier sequence number, an anchor carrier sequence number list, a non-anchor carrier sequence number, a non-anchor carrier sequence number list, an uplink non-anchor carrier frequency point sequence number, and an uplink non-anchor carrier frequency point sequence number list.

The carrier configuration monitored for receiving the PDCCH channel includes at least one of or any combination of: the carrier frequency point, the carrier frequency point list, the anchor carrier frequency point, the anchor carrier frequency point list, the non-anchor carrier frequency point, the non-anchor carrier frequency point list, a downlink non-anchor carrier frequency point, a downlink non-anchor carrier frequency point list, the carrier sequence number, the carrier sequence number list, the anchor carrier sequence number, the anchor carrier sequence number list, the non-anchor carrier sequence number, the non-anchor carrier sequence number list, a downlink non-anchor carrier frequency point sequence number, and a downlink non-anchor carrier frequency point sequence number list.

In an exemplary embodiment, the method may further include:

When the terminal selects a certain uplink carrier to initiate the random access, the terminal selects, according to the correspondence, the carrier configuration corresponding to the certain uplink carrier and monitored for receiving the PDCCH channel to monitor and receive the PDCCH channel. The correspondence includes at least one of or any combination of:

a correspondence in which one uplink carrier configuration corresponds to one carrier configuration monitored for receiving the PDCCH channel;

a correspondence in which one uplink carrier configuration corresponds to multiple carrier configurations monitored for receiving the PDCCH channel, where the multiple carrier configurations monitored for receiving the PDCCH channel are represented in a Bitmap form, a preset value 1 in a Bitmap represents a carrier corresponding to the uplink carrier configuration, and a preset value 2 in the Bitmap represents a carrier not corresponding to the uplink carrier configuration;

a correspondence in which multiple uplink carrier configurations correspond to one carrier configuration monitored for receiving the PDCCH channel, where the multiple uplink carrier configurations are represented in the Bitmap form, a preset value 1 in a Bitmap represents a carrier corresponding to the carrier configuration monitored for receiving the PDCCH channel, and a preset value 2 in the Bitmap represents a carrier not corresponding to the carrier configuration monitored for receiving the PDCCH channel.

In an exemplary embodiment, the method may further include:

when the terminal selects an ith carrier to initiate the random access in the uplink carrier configuration, the terminal determines, according to a preset algorithm, to select a jth carrier to monitor and receive a PDCCH channel in the carrier configuration monitored for receiving the PDCCH channel and having the correspondence.

The preset algorithm may be implemented in any mode described below.

In a mode one: if $Npd=Npa$, let $j=i$, if $Npd \neq Npa$, let $j=(i+k0*Ns) \bmod Npd + N0$, Npd is a total number of carriers in the carrier configuration monitored for receiving the PDCCH channel and having the correspondence, Npa is a total number of the carriers in the random access carrier configuration, or the Npa is a total number of the carriers in the uplink carrier configuration having the correspondence, Ns is a subcarrier identity factor of the ith carrier in the random access carrier configuration or a function of the subcarrier identity factor, or Ns is a current coverage level factor of the terminal or a function of the current coverage level factor, k0 and N0 are preset constants.

In a mode two: if $Npd=Npa$, let $j=i$, if $Npd \neq Npa$, effective values of Ns on the ith carrier are divided into Npd segments, and these segments may be identified as M1, M2, . . . MNpd in an ascending order. When the terminal initiates the random access on the ith carrier, the terminal selects the carrier monitored for receiving the PDCCH channel according to which one of the Npd segments the value of Ns in a selected random access resource falls into. For example, the value of Ns in the selected random access resource falls into a Mjth segment, the jth carrier is selected as the carrier monitored for receiving the PDCCH channel.

Npd is a total number of carriers in the carrier configuration monitored for receiving the PDCCH channel and having the correspondence, Npa is a total number of the carriers in the random access carrier configuration, or the Npa is a total number of the carriers in the uplink carrier configuration, Ns is a subcarrier identity factor in the random access carrier configuration or a function of the subcarrier identity factor, or Ns is a current coverage level factor of the terminal or a function of the current coverage level factor.

In a mode three: if $Npd=Npa$, let $j=i$, if $Npd \neq Npa$, let $j=(i+k1*T) \bmod Npd + N1$, Npd is a total number of carriers in the carrier configuration monitored for receiving the PDCCH channel and having the correspondence, Npa is a total number of the carriers in the random access carrier configuration, or the Npa is a total number of the carriers in the uplink carrier configuration, T is a time domain factor, and k1 and N1 are preset constants.

The time domain factor includes at least one of: a first radio frame sequence number of the selected random access resource, a first radio subframe sequence number of the selected random access resource, a first radio frame sequence number of a transmission random access preamble, and a first radio subframe sequence number of the transmission random access preamble.

$N0=1$, $N1=1$, k0 is a maximum value of i, k1 is the maximum value of i, and the minimum value of i and the minimum value of j are 1.

Each item of each of the non-anchor carrier configuration parameter list, the uplink non-anchor carrier configuration parameter list, and the downlink non-anchor carrier configuration parameter list includes: other physical layer parameters.

Each item of each of the non-anchor carrier configuration parameter list, the uplink non-anchor carrier configuration parameter list, and the downlink non-anchor carrier configuration parameter list includes: a frequency band feature parameter. The carrier feature parameter includes one of: a guard band, an in-band and a standalone band.

In an exemplary embodiment, the method may further include:

the random access resource configuration list for the non-anchor carrier at least includes one item of the random access resource configuration corresponding to the radio coverage level.

If the non-anchor carrier configuration does not include the random access resource configuration, a default configuration is that the random access resource configuration for the non-anchor carrier may be the same as the random access resource configuration for the anchor carrier.

Different non-anchor carrier have a same random access resource configuration, or have different random access resource configurations.

In one exemplary embodiment, the other physical layer parameters include at least one of or any combination of: a downlink subframe configuration, a downlink transmission gap configuration, a size of evolved universal terrestrial radio access (E-UTRA) control region in an in-band operation mode.

The terminal may receive a difference between the non-anchor carrier radio coverage level RSRP threshold and the anchor carrier radio coverage level RSRP threshold, where the difference broadcast by the network device.

The difference may be a difference list. Each item in the difference list represents a difference between a RSRP threshold for radio coverage level list for a certain non-anchor carrier and a RSRP threshold for radio coverage level list for a certain anchor carrier. If the difference list has only one item, the item represents a difference between the RSRP threshold for radio coverage level list for all non-anchor carriers and the RSRP threshold for radio coverage level list for all anchor carriers.

In one exemplary embodiment, the first indication information, the second indication information, the third indication information, the fourth indication information, the fifth indication information and the sixth indication information may be different values of the same indication information, or two or more of the above indication information are indicated by one indication.

In one exemplary embodiment, the above method further includes at least one of or any combination of:

the terminal receives the non-anchor carrier configuration broadcast by the network device;

the terminal receives each radio coverage level's corresponding random access carrier configuration broadcast by the network device; and the terminal receives a carrier configuration broadcast by the network device, which is monitored for receiving the PDCCH channel and corresponds to each radio coverage level. A carrier that the terminal cannot support is not included in the network system resource configuration actually used.

Examples are described below.

Example One

System information broadcast by the network device and received by the terminal is shown as follows. A revision mark is used to represent the non-anchor carrier configuration added to a current configuration and the random access carrier configuration added to a random access configuration.

```
SystemInformationBlockTypeX-NB ::=    SEQUENCE {
......
nonAnchorCarrierList-r14              NonAnchorCarrierList-NB-R14
NonAnchorCarrierList-NB-r14           ::=SEQUENCE (
nonAnchorCarrierListCommon-NB-r14     NonAnchorCarrierListCommon-NB-r14
}
}
    NonAnchorCarrierListCommon-NB-r14     ::=SEQUENCE (SIZE (1..maxNonAnchorCarrier))
OF CarrierFreq-NB-r14
    RadioResourceConfigCommonSIB-NB-r13 ::=SEQUENCE {
    rach-ConfigCommon-r13      RACH-ConfigCommon-NB-r13,
    bcch-Config-r13            BCCH-Config-NB-r13,
    pcch-Config-r13            PCCH-Config-NB-r13,
    nprach-Config-r13          NPRACH-ConfigSIB-NB-r13,
    npdsch-ConfigCommon-r13    NPDSCH-ConfigCommon-NB-r13,
    npusch-ConfigCommon-r13    NPUSCH-ConfigCommon-NB-r13,
    dl-Gap-r13   DL-GapConfig-NB-r13  OPTIONAL, -- Need OP
    uplinkPowerControlCommon-r13   UplinkPowerControlCommon-NB-r13,
[[[
    nprach-Config-r14 NPRACH-ConfigSIB-NB-r14   OPTIONAL,
]]
}
    NPRACH-ConfigSIB-NB-r14 ::= SEQUENCE (SIZE (1.. maxNPRACH-Resources-NB-r13)) OF
NPRACH-Parameters-NB-r14
```

In the above configuration, the SystemInformationBlockTypeX (the SystemInformationBlockTypeX may be SIB1, SIB2 or other SIB information) includes the non-anchor carrier configuration. The non-anchor carrier configuration includes non-anchor carrier frequency point configurations with a total number of maxNonAnchorCarrier.

The old version, the terminal performs monitoring pages on an anchor carrier, and initiates random access on the anchor carrier by using a nprach-Config-r13 configuration.

When the new version terminal receives the above non-anchor carrier frequency point configuration, it may be considered that the new version terminal receives an implicit indication of the network device, indicating that the new version terminal may select one of these non-anchor carrier frequency points to monitor pages or initiate the random access.

The random access resource configuration may include a random access resource configuration NPRACH-ConfigSIB-NB-r14 that the new version terminal needs to additionally receive. The NPRACH-ConfigSIB-NB-r14 includes multiple random access resource configurations corresponding to coverage levels. Each random access resource configuration NPRACH-Parameters-NB-r14 mainly includes the random access carrier configuration. The random access carrier configuration may include frequency points of multiple random access carriers. The frequency points correspond to frequency points of the anchor carriers and/or non-anchor carriers broadcast in the system information. The random access carrier configuration may also include sequence numbers CarrierFreqIndex-NB-r14 of the multiple random access carriers, the sequence numbers correspond to sequence numbers of the anchor carriers and/or non-anchor carriers broadcast in the system information. The above embodiment adopts the latter configuration mode. The sequence number of the anchor carrier may be considered to be the smallest.

When the terminal selects one carrier as an access carrier according to the random access carrier configuration of the current coverage level, the used random access resource configuration is the original random access resource configuration, that is, the used random access resource configuration is the random access resource configuration corresponding to the current coverage level on the anchor carrier.

Here, maxNPRACH-Carrier is less than or equal to maxNonAnchorCarrier.

Example Two

On the basis of the example one, eachNPRACH-Parameters-NB-r14, in addition to include the random access carrier configuration, may also include the random access resource configuration NPRACH-CarrierConfig-NB-r14 corresponding to the carrier configuration.

```
SystemInformationBlockTypeX-NB ::=       SEQUENCE {
......
nonAnchorCarrierList-r14                 NonAnchorCarrierList-NB-R14
NonAnchorCarrierList-NB-r14              ::= SEQUENCE (
nonAnchorCarrierListCommon-NB-r14        NonAnchorCarrierListCommon-NB-r14
}
}
    NonAnchorCarrierListCommon-NB-r14            ::= SEQUENCE (SIZE (1..maxNonAnchorCarrier))
OF CarrierFreq-NB-r14
......
    RadioResourceConfigCommonSIB-NB-r13 ::=SEQUENCE {
    rach-ConfigCommon-r13    RACH-ConfigCommon-NB-r13,
    bcch-Config-r13          BCCH-Config-NB-r13,
    pcch-Config-r13          PCCH-Config-NB-r13,
    nprach-Config-r13          NPRACH-ConfigSIB-NB-r13,
    npdsch-ConfigCommon-r13        NPDSCH-ConfigCommon-NB-r13,
    npusch-ConfigCommon-r13        NPUSCH-ConfigCommon-NB-r13,
    dl-Gap-r13       DL-GapConfig-NB-r13     OPTIONAL, -- Need OP
    uplinkPowerControlCommon-r13                              UplinkPowerControlCommon-NB-r13,
    ...
    [[
    nprach-Config-r14 NPRACH-ConfigSIB-NB-r14 OPTIONAL,
    ]]
    }
    NPRACH-ConfigSIB-NB-r14 ::= SEQUENCE (SIZE (1.. maxNPRACH-Resources-NB-r13)) OF
    NPRACH-Parameters-NB-r14
    NPRACH-Parameters-NB-r14 ::=   SEQUENCE {
       nprach-CarrierList-NB-r14                    NPRACH-CarrierList-NB-r14,
       nprach-CarrierConfig-NB-r14              NPRACH-CarrierConfig-NB-r14     OPTIONAL,
    }
    NPRACH-CarrierList-NB-r14::= SEQUENCE (SIZE (1.. maxNPRACH-Carrier)) OF
    CarrierFreqIndex-NB-r14
```

When the above configuration mode is used, it means that the random access resource configuration for the random access carrier may be different from the random access resource configuration for the non-anchor carrier. A definition of NPRACH-CarrierConfig-NB-r14 may be similar to the configuration mode of a PRACH resource for each coverage level in NPRACH-ConfigSIB-NB-r13. If NPRACH-CarrierList-NB-r14 includes multiple non-anchor carriers, then the multiple non-anchor carriers correspond to the same random access resource configuration.

Example Three

On the basis of the example one, each non-anchor carrier configuration, in addition to include frequency point information, may also include other physical parameter configurations, such as waiting time shown below.

```
SystemInformationBlockTypeX-NB ::=                          SEQUENCE {
......
nonAnchorCarrierList-r14                            NonAnchorCarrierList-NB-R14
NonAnchorCarrierList-NB-r14                         ::= SEQUENCE (
nonAnchorCarrierListCommon-NB-r14                   NonAnchorCarrierListCommon-NB-r14
}
}
NonAnchorCarrierListCommon-NB-r14 ::= SEQUENCE (SIZE (1.. maxNonAnchorCarrier)) OF
NonAnchorCarrierCommon-NB-r14
NonAnchorCarrierCommon-NB-r14 ::= SEQUENCE {
carrierFreq-NB-r14                                  CarrierFreq-NB-r14,
downlinkBitmapCarrier-r14 DownlinkBitmapCarrier-r14 OPTIONAL, -- Need ON
dl-GapCarrier-r14 DL-GapCarrier-r14                                 OPTIONAL, - Need ON
inbandCarrierInfo-r14 INbandCarrierInfo-r14 OPTIONAL,-- Cond
...
}
DownlinkBitmapCarrier-r14   ::=CHOICE {
useNoBitmap-r14                         NULL,
useSameBitmapAsPrevious-r14 NULL,
explicitBitmapConfiguration-r14 DL-Bitmap-NB-r13,
spare NULL
}
DL-GapCarrier-r14                                ::= CHOICE  {
useNoGap-r14  NULL,
useSameGapConfigAsPrevious-r14                      NULL,
explicitGapConfiguration-r14   DL-GapConfig-NB-r13,
spare  NULL
}
INbandCarrierInfo-r14                            ::= SEQUENCE {
samePCI-Indicator-r14   CHOICE {
samePCI-r14                     SEQUENCE {
indexToMidPRB-r14   INTEGER (-55..54)
},
differentPCI-r14   SEQUENCE {
eutra-NumCRS-Ports-r14                                  ENUMERATED {same, four}
}
}   OPTIONAL, -- Cond anchor-guardband
eutraControlRegionSize-r14 ENUMERATED {n1, n2, n3}
}
RadioResourceConfigCommonSIB-NB-r13 ::=SEQUENCE {
rach-ConfigCommon-r13                       RACH-ConfigCommon-NB-r13,
bcch-Config-r13                       BCCH-Config-NB-r13,
pcch-Config-r13                       PCCH-Config-NB-r13,
nprach-Config-r13                      NPRACH-ConfigSIB-NB-r13,
npdsch-ConfigCommon-r13                       NPDSCH-ConfigCommon-NB-r13,
npusch-ConfigCommon-r13                       NPUSCH-ConfigCommon-NB-r13,
dl-Gap-r13               DL-GapConfig-NB-r13     OPTIONAL, -- Need OP
uplinkPowerControlCommon-r13                       UplinkPowerControlCommon-NB-r13,
...
[[
nprach-Config-r14                 NPRACH-ConfigSIB-NB-r14 OPTIONAL,
]]
}
......
```

Example Four

On the basis of the example one, in addition to the random access carrier configuration, the carrier configuration monitored for receiving the PDCCH is also added into the random access resource configuration.

```
SystemInformationBlockTypeX-NB :: = SEQUENCE {
......
nonAnchorCarrierList-r14          NonAnchorCarrierList-NB-R14
NonAnchorCarrierList-NB-r14       ::= SEQUENCE (
nonAnchorCarrierListCommon-NB-r14   NonAnchorCarrierListCommon-NB-r14
}
}
    NonAnchorCarrierListCommon-NB-r14    ::= SEQUENCE (SIZE (1.. maxNonAnchorCarrier))
OF CarriererFreq-NB-r14
......
    RadioResourceConfigCommonSIB-NB-r13 ::= SEQUENCE {
    rach-ConfigCommon-r13 RACH-ConfigCommon-NB-r13,
    bcch-Config-r13 BCCH-Config-NB-r13,
    pcch-Config-r13 PCCH-Config-NB-r13,
    nprach-Config-r13 NPRACH-ConfigSIB-NB-r13,
    npdsch-ConfigCommon-r13 NPDSCH-ConfigCommon-NB-r13,
    npusch-ConfigCommon-r13 NPUSCH-ConfigCommon-NB-r13,
    dl-Gap-r13 DL-GapConfig-NB-r13 OPTIONAL, -- Need OP
    uplinkPowerControlCommon-r13 UplinkPowerControlCommon-NB-r13,
    ...
    [[
    nprach-Config-r14 NPRACH-ConfigSIB-NB-r14 OPTIONAL,
    npdcch-Config-r14 NPDCCH-ConfigSIB-NB-r14 OPTIONAL,
    ]]
    }
    NPRACH-ConfigSIB-NB-r14 ::= SEQUENCE (SIZE (1.. maxNPRACH-Resources-NB-r13)) OF
NPRACH-Parameters-NB-r14
    NPRACH-Parameters-NB-r14::= SEQUENCE (SIZE (1.. maxNPRACH-Carrier)) OF
CarrierFreqIndex-NB-r14
    NPDCCH-ConfigSIB-NB-r14 ::= SEQUENCE (SIZE (1.. maxNPRACH-Resources-NB-r13)) OF
NPDCCH-Parameters-NB-r14
    NPDCCH-Parameters-NB-r14 ::= SEQUENCE (SIZE (1.. maxNPDCCH-Carrier)) OF
CarrierFreqIndex-NB-r14
```

In the above configuration, the SystemInformationBlockTypeX (the SystemInformationBlockTypeX may be SIB1, SIB2 or other SIB information) includes the non-anchor carrier configuration. The non-anchor carrier configuration includes the non-anchor carrier frequency point configurations with the total number of maxNonAnchorCarrier.

The old version terminal monitors pages on the anchor carrier, and initiates the random access on the anchor carrier by using the nprach-Config-r13 configuration.

When the new version terminal receives the above non-anchor carrier frequency point configuration, it may be considered that the new version terminal receives the implicit indication from the network device, indicating that the new version terminal may select one of these non-anchor carrier frequency points to monitor pages or initiate the random access.

The random access resource configuration further includes the random access resource configuration NPRACH-ConfigSIB-NB-r14 that the new version terminal needs to additionally receive. The NPRACH-ConfigSIB-NB-r14 includes multiple random access resource configurations corresponding to the coverage levels. Each random access resource configurationNPRACH-Parameters-NB-r14 includes the random access carrier configuration. The random access carrier configuration may include frequency points of multiple random access carriers, and may also include sequence numbers CarrierFreqIndex-NB-r14 of the multiple random access carriers. The sequence number corresponds to the sequence number of the anchor carrier and/or non-anchor carrier broadcast in the system information. The sequence number of the anchor carrier may be considered to be the smallest.

The random access resource configuration further includes the carrier configuration NPDCCH-ConfigSIB-NB-r14 that the new version terminal needs to additionally receive, where the carrier configuration NPDCCH-ConfigSIB-NB-r14 is monitored for receiving the PDCCH channel. The NPDCCH-ConfigSIB-NB-r14 includes multiple carrier configurations corresponding to the coverage levels. A NPDCCH monitoring carrier configuration corresponding to each coverage level may include frequency points of multiple carriers monitored for receiving the PDCCH channel (the number is equal to the number of the random access carriers under each coverage level, and accordingly, the maximum is maxNPRACH-Carrier, alternatively, the number is different from the number of the random access carriers under each coverage level, and accordingly, the maximum is maxNPDCCH-Carrier). The NPDCCH monitoring carrier configuration may include sequence numbers CarrierFreqIndex-NB-r14 of the multiple carriers monitored for receiving the PDCCH channel, and the sequence number corresponds to the sequence number of the anchor carrier and/or non-anchor carrier broadcast in the system information. The sequence number of the anchor carrier may be considered to be the smallest.

For a certain coverage level, when the number of carriers in the random access carrier configuration is equal to the number of carriers in the carrier configuration monitored for receiving the PDCCH channel, it may be considered that the carriers in the random access carrier configuration and the carriers in the carrier configuration monitored for receiving the PDCCH channel are in one-to-one correspondence in sequence. That is, if the random access is initiated on a nth carrier in the random access carrier configuration, the PDCCH channel is monitored to on a nth carrier in the carrier configuration monitored for receiving the PDCCH channel. When the number of carriers in the random access carrier configuration is not equal to the number of carriers in the carrier configuration monitored for receiving the PDCCH channel and the terminal selects an ith carrier to initiate the random access in the random access carrier configuration, the terminal selects a jth carrier to monitor and receive the PDCCH channel in the carrier configuration monitored for receiving the PDCCH channel according to the following preset algorithm.

$$j = \begin{cases} Npd/i, & \text{if } Npd > Npa \\ (i \bmod Npd) + 1, & \text{if } Npd \leq Npa \end{cases}$$

Npd is a total number of carriers in the carrier configuration monitored for receiving the PDCCH channel, Npa is a total number of the carriers in the random access carrier configuration, and a minimum value of i and a minimum value of j are 1.

Example Five

On the basis of the example four, the non-anchor carrier configuration may include an uplink non-anchor carrier configuration and a downlink non-anchor carrier configuration, NPRACH-ConfigSIB-NB-r14 and NPDCCH-Parameters-NB-r14 may be respectively configured based on the uplink non-anchor carrier and the downlink non-anchor carrier. The configuration difference is described below.

In the above configuration, the SystemInformationBlockTypeX (the SystemInformationBlockTypeX may be SIB1, SIB2 or other SIB information) includes the non-anchor carrier configuration. The non-anchor carrier configuration not only includes non-anchor carrier frequency points a total number of which is maxNonAnchorCarrier, but also includes the random access resource configuration.

The random access resource configuration and a PRACH configuration on the anchor carrier adopt a similar structure, that is, including multiple random access resource configurations corresponding to the coverage levels. Values of various parameters in the random access resource configuration may be different from values of various parameters in the PRACH configuration on the anchor carrier. However, for all non-anchor carriers, their random access resource configurations are same.

When the terminal can parse the newly added fields described above, the terminal preferentially selects one carrier in the non-anchor carrier configuration to execute the subsequent random access process.

Example Seven

The system information broadcast by the network device and received by the terminal is shown as follows. The revision mark is used to represent the non-anchor carrier configuration added to the current configuration.

```
SystemInformationBlockTypeX-NB :: = SEQUENCE {
......
nonAnchorCarrierList-r14          NonAnchorCarrierList-NB-R14
NonAnchorCarrierList-NB-r14       ::= SEQUENCE (
dl-NonAnchorCarrierConfig-r14        DL-NonAnchorCarrierConfig-r14,
ul-NonAnchorCarrierConfig-r14        UL-NonAnchorCarrierConfig-r14
}
}
DL-NonAnchorCarrierConfig-r14     ::= SEQUENCE (SIZE (1..maxDLNonAnchorCarrier)) OF
CarrierFreq-NB-r14
UL-NonAnchorCarrierConfig-r14     ::= SEQUENCE (SIZE (1..maxULNonAnchorCarrier)) OF
CarrierFreq-NB-r14
```

Example Six

The system information broadcast by the network device and received by the terminal is shown as follows. The revision mark is used to represent the non-anchor carrier configuration added to the current configuration.

```
SystemInformationBlockTypeX-NB :: = SEQUENCE {
......
nonAnchorCarrierList-r14              NonAnchorCarrierList-NB-r14
NonAnchorCarrierList-NB-r14           ::= SEQUENCE (
nonAnchorCarrierListCommon-NB-r14        NonAnchorCarrierListCommon-NB-r14,
prachConfigOnNonAnchor-r14 NPRACH-ConfigSIB-NB-r13
}
}
NonAnchorCarrierListCommon-NB-r14     ::= SEQUENCE (SIZE (1..maxNonAnchorCarrier))
OF CarrierFreq-NB-r14
```

```
ystemInformationBlockTypeX-NB ::= SEQUENCE {
......
nonAnchorCarrierList-r14          NonAnchorCarrierList-NB-r14
NonAnchorCarrierList-NB-r14       ::= SEQUENCE (SIZE
(1..maxNonAnchorCarrier)) OF NonAnchorCarrierCommon-NB-r14
```

```
NonAnchorCarrierCommon-NB-r13 ::= SEQUENCE {
dl-NonAnchorCarrierConfig-r14    CarrierFreq-NB-r14,
ul-NonAnchorCarrierConfig-r14    UL-CarrierConfigDedicated-NB-r14
}
}
UL-CarrierConfigDedicated-NB-r14 ::= SEQUENCE {
ul-CarrierFreq-r14 CarrierFreq-NB-r13
prachConfigOnNonAnchor-r14    NPRACH-ConfigSIB-NB-r13,
}
```

In the configuration of the above embodiment, the SystemInformationBlockTypeX (the SystemInformationBlockTypeX may be SIB1, SIB2 or other SIB information) includes non-anchor carrier dedicated configurations with a total number of maxNonAnchorCarrier. Each non-anchor carrier dedicated configuration includes an uplink configuration and a downlink confirmation. The total number of uplink carriers and the total number of downlink carriers of are the same and both are maxNonAnchorCarrier.

Each downlink non-anchor carrier configuration mainly includes frequency point information. The uplink non-anchor carrier configuration includes the frequency point and the random access resource configuration. The random access resource configuration and the PRACH configuration on the anchor carrier adopt a similar structure. That is, the uplink non-anchor carrier configuration includes multiple random access resource configurations corresponding to the coverage levels. The values of various parameters in the random access resource configuration may be different from that in the PRACH configuration on the anchor carrier, and the non-anchor carriers may have different random access resource configurations.

When the terminal is capable of parsing the newly added fields described above, the terminal preferentially selects one carrier in the non-anchor carrier configuration to execute the subsequent random access process.

Example Eight

The system information broadcast by the network device and received by the terminal is shown as follows. The revision mark is used to represent the non-anchor carrier configuration added to the current configuration.

```
SystemInformationBlockTypeX-NB ::= SEQUENCE {
......
DLNonAnchorCarrierList-NB-r14 ::= SEQUENCE (SIZE
(1..maxDLNonAnchorCarrier)) OF DLNonAnchorCarrierCommon-NB-r14
ULNonAnchorCarrierList-NB-r14 ::= SEQUENCE (SIZE
(1..maxULNonAnchorCarrier)) OF ULNonAnchorCarrierCommon-NB-r14
DLNonAnchorCarrierCommon-NB-r14 ::= SEQUENCE {
dl-NonAnchorCarrierConfig-r14            DL-CarrierConfigDedicated-NB-r14,
}
ULNonAnchorCarrierCommon-NB-r14 ::= SEQUENCE {
ul-NonAnchorCarrierConfig-r14            UL-CarrierConfigDedicatedBis-NB-r14,
}
}
DL-CarrierConfigDedicated-NB-r14 ::=       SEQUENCE {
dl-carrierFreq-NB-r14                     CarrierFreq-NB-r14,
downlinkBitmapCarrier-r14DownlinkBitmapCarrier-r14OPTIONAL,   -- Need ON
dl-GapCarrier-r14 DL-GapCarrier-r14               OPTIONAL, --Need ON
inbandCarrierInfo-r14 INbandCarrierInfo-r14 OPTIONAL, -- Cond
...
}
UL-CarrierConfigDedicatedBis-NB-r14 ::= SEQUENCE {
ul-CarrierFreq-r14   CarrierFreq-NB-r14
prachConfigOnNonAnchor-r14            NPRACH-ConfigSIB-NB-r13,
}
```

In the configuration of the above embodiment, the SystemInformationBlockTypeX (the SystemInformationBlockTypeX may be SIB1, SIB2 or other SIB information) includes downlink non-anchor carrier dedicated configurations with a total number of maxDLNonAnchorCarrier and uplink non-anchor carrier dedicated configurations with a total number of maxULNonAnchorCarrier. Generally, maxDLNonAnchorCarrier and maxULNonAnchorCarrier are different.

Each downlink non-anchor carrier dedicated configuration includes the frequency point and other physical layer parameters. Each uplink non-anchor carrier dedicated configuration includes the frequency point and the random access resource configuration. The random access resource configuration adopts a structure similar with that in the PRACH configuration on the anchor carrier, that is, the random access resource configuration includes multiple random access resource configurations each of which corresponds to a respective one of the coverage levels. The values of various parameters in the random access resource configuration may be different from that in the PRACH configuration on the anchor carrier, and the non-anchor carriers may have different random access resource configurations.

The terminal and base station determine, according to the preset algorithm, to monitor the PDCCH channel on a jth downlink non-anchor carrier when initiating the random access on an ith uplink non-anchor carrier. A possible preset algorithm is described below.

$$j = \begin{cases} Npd/i, & \text{if } Npd > Npa \\ (i \bmod Npd) + 1, & \text{if } Npd \leq Npa \end{cases}$$

Npd is maxDLNonAnchorCarrier, Npa is maxULNonAnchorCarrier, and the minimum value of i and the minimum value of j are 1.

When the terminal is capable of parsing the newly added fields described above, the terminal preferentially selects one carrier in the non-anchor carrier configuration to execute the subsequent random access process.

Example Nine

The system information broadcast by the network device and received by the terminal is shown as follows. The revision mark is used for representing an indication that the terminal capable of initiating the random access on the non-anchor carrier preferentially initiates the random access on the non-anchor carrier and an instruction that the terminal capable of receiving paging on the non-anchor carrier preferentially receives paging on the non-anchor carrier, which are newly added to the current configuration.

```
SystemInformationBlockTypeX-NB ::= SEQUENCE {
......
    randomAccessOnNonAnchorCarrier-NB-r14    BOOLEAN,
    pagingOnNonAnchorCarrier-NB-r14          BOOLEAN,
}
```

When the terminal is capable of parsing the newly added fields described above, no matter which non-anchor carrier configuration or random access resource configuration is adopted, the terminal preferentially selects one carrier in the non-anchor carrier configuration to monitor pages or execute the subsequent random access process.

Example Ten

Example ten is a comprehensive example based on the first implementation mode described above. The network device broadcasts all non-anchor carrier configurations by the system information. The non-anchor carrier configuration at least includes a non-anchor carrier frequency point list. Each non-anchor carrier in the non-anchor carrier configuration has a uplink non-anchor carrier configuration for the case where the non-anchor carrier is used for uplink and a downlink non-anchor carrier configuration for the case where the non-anchor carrier is used for downlink. The random access resource configuration broadcast by network device via the system information includes a random access frequency point configuration. The random access frequency point configuration includes random access frequency point lists configured for coverage levels. The random access frequency point list includes one or more frequency points or frequency point sequence numbers.

```
SystemInformationBlockTypeX-NB ::= SEQUENCE {
......
    nonAnchorCarrierList-r14        NonAnchorCarrierList-NB-R14
}
NonAnchorCarrierList-NB-r14 ::= SEQUENCE (SIZE (1.. maxNonAnchorCarrier)) OF NonAnchorCarrierFreq-NB-r14
    NonAnchorCarrierFreq-NB-r14   ::= SEQUENCE (
    dl-NonAnchorCarrierConfig-r14 CarrierFreq-NB-r14,
    ul-NonAnchorCarrierConfig-r14 CarrierFreq-NB-r14
}
......
RadioResourceConfigCommonSIB-NB-r13 ::= SEQUENCE {
    rach-ConfigCommon-r13    RACH-ConfigCommon-NB-r13,
    bcch-Config-r13    BCCH-Config-NB-r13,
    pcch-Config-r13    PCCH-Config-NB-r13,
    nprach-Config-r13    NPRACH-ConfigSIB-NB-r13,
    npdsch-ConfigCommon-r13    NPDSCH-ConfigCommon-NB-r13,
    npusch-ConfigCommon-r13    NPUSCH-ConfigCommon-NB-r13,
    dl-Gap-r13    DL-GapConfig-NB-r13    OPTIONAL, -- Need OP
    uplinkPowerControlCommon-r13    UplinkPowerControlCommon-NB-r13,
    ...
    [[
    nprach-CarrierConfig-r14    NPRACH-CarrierConfigSIB-NB-r14    OPTIONAL,
    ]]
}
    NPRACH-CarrierConfigSIB-NB-r14 ::= SEQUENCE(SIZE(1.. maxNPRACH-Resources-NB-r13)) OF NPRACH-Parameters-NB-r14
    NPRACH-Parameters-NB-r14::=    SEQUENCE(SIZE (1..   maxNPRACH-Carrier)) OF CarrierFreq-NB-r13
```

Each one of all frequency points of the frequency point list corresponding to this coverage level includes one PRACH resource configuration, that is, the definition of NPRACH-Parameters-NB-r14 is modified as follows:

```
NPRACH-Parameters-NB-r14::=   SEQUENCE (
carrierList-r14    CarrierList-r14
carrierPRACHConfig NPRACH-ConfigSIB-NB-r14,
}
    CarrierList-r14::=   SEQUENCE (SIZE (1.. maxNPRACH-Carrier)) OF CarrierFreq-NB-r13
```

Example Eleven

In the example eleven, the non-anchor carrier configuration further includes at least one of or any combination of: a random access resource configuration list for the non-anchor carrier, a reference signal receiving power (RSRP) threshold for radio coverage level list for the non-anchor carrier and a RSRP threshold for radio coverage level list for the downlink non-anchor carrier. The network device broadcasts all non-anchor carrier configurations by the system information. Each non-anchor carrier in the non-anchor carrier configurations has a configuration for the case where the non-anchor carrier is used for uplink and a configuration for the case where the non-anchor carrier is used for downlink. The non-anchor carrier configuration at least includes the non-anchor carrier frequency point list, and the random access resource configuration configured for each non-anchor carrier.

```
SystemInformationBlockTypeX-NB ::= SEQUENCE {
......
nonAnchorCarrierList-r14            NonAnchorCarrierList-NB-r14
}
NonAnchorCarrierList-NB-r14        ::= SEQUENCE (SIZE
(1..maxNonAnchorCarrier)) OF NonAnchorCarrierCommon-NB-r14
NonAnchorCarrierCommon-NB-r13 ::= SEQUENCE {
dl-NonAnchorCarrierConfig-r14    CarrierFreq-NB-r14,
ul-NonAnchorCarrierConfig-r14    UL-CarrierConfigDedicated-NB-r14
}
UL-CarrierConfigDedicated-NB-r14 ::= SEQUENCE {
ul-CarrierFreq-r14    CarrierFreq-NB-r13
prachConfigOnNonAnchor-r14    NPRACH-ConfigSIB-NB-r14,
}
```

Figure 2:
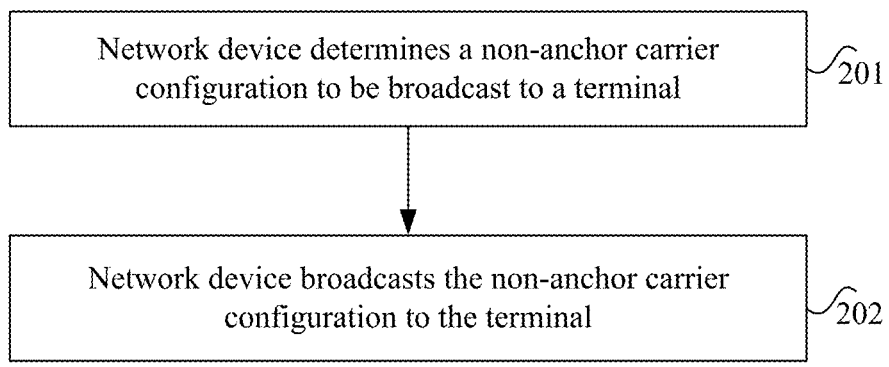
FIG. 2 is a flowchart of a method for transmitting a network system resource configuration according to an embodiment of the present disclosure.

FIG. 2 is a flowchart of a method for transmitting a network system resource configuration according to an embodiment of the present disclosure. The method may be executed by a network device. As shown in FIG. 2, the method includes steps 201 and 202.

In step 201, the network device determines a non-anchor carrier configuration to be broadcast to the terminal.

In this embodiment, the non-anchor carrier configuration includes at least one of or any combination of: a non-anchor carrier frequency point list, a non-anchor carrier configuration parameter list, an uplink non-anchor carrier frequency point list, an uplink non-anchor carrier configuration parameter list, a downlink non-anchor carrier frequency point list and a downlink non-anchor carrier configuration parameter list.

In step 202, the network device broadcasts the non-anchor carrier configuration to the terminal.

In this embodiment, the network device determines the non-anchor carrier configuration broadcast to the terminal, and then broadcasts the non-anchor carrier configuration to the terminal. The non-anchor carrier configuration includes at least one of or any combination of: the non-anchor carrier frequency point list, the non-anchor carrier configuration parameter list, the uplink non-anchor carrier frequency point list, the uplink non-anchor carrier configuration parameter list, the downlink non-anchor carrier frequency point list and the downlink non-anchor carrier configuration parameter list. In this way, the terminal performs the random access and monitoring pages on the non-anchor carrier, thereby improving the ability of the paging and random access capacity of the network device.

The non-anchor carrier configuration further includes at least one of or any combination of:

a non-anchor carrier random access resource configuration list, a non-anchor carrier radio coverage level reference signal receiving power (RSRP) threshold list and a downlink non-anchor carrier radio coverage level RSRP threshold list.

In an exemplary embodiment, the method may further include:

the network device broadcasts a random access carrier configuration corresponding to each radio coverage level to the terminal, where the random access carrier configuration includes at least one of or any combination of: a carrier frequency point, a carrier frequency point list, an anchor carrier frequency point, an anchor carrier frequency point list, a non-anchor carrier frequency point, a non-anchor carrier frequency point list, an uplink non-anchor carrier frequency point, an uplink non-anchor carrier frequency point list, a carrier sequence number, a carrier sequence number list, an anchor carrier sequence number, an anchor carrier sequence number list, a non-anchor carrier sequence number, a non-anchor carrier sequence number list, an uplink non-anchor carrier frequency point sequence number, an uplink non-anchor carrier frequency point sequence number list, and random access resource configurations corresponding to the above frequency points or frequency point lists. The carrier frequency point includes the anchor carrier frequency point and the non-anchor carrier frequency point, and the carrier frequency point list comprises the anchor carrier frequency point list and the non-anchor carrier frequency point list.

In an exemplary embodiment, the method may further include:

the network device broadcasts first indication information to the terminal, where the first indication information is used for instructing the terminal to monitor pages on a first non-anchor carrier, or a first downlink non-anchor carrier, or the first non-anchor carrier and the first downlink non-anchor carrier;

alternatively, the network device broadcasts third indication information to the terminal, where the third indication information is used for instructing the terminal to monitor pages on a first anchor carrier;

alternatively, the network device broadcasts fifth indication information to the terminal, where the fifth indication information is used for instructing the terminal to monitor pages on the first anchor carrier, the first non-anchor carrier, or the first downlink non-anchor carrier, where the first non-anchor carrier includes at least one non-anchor carrier in the non-anchor carrier configuration, the first downlink non-anchor carrier includes at least one downlink non-anchor carrier in the non-anchor carrier configuration, and the first anchor carrier includes at least one anchor carrier in an anchor carrier list broadcast by a system;

alternatively, the network device broadcasts seventh indication information to the terminal, where the seventh indication information is used for indicating whether resources used by the terminal for monitoring pages include the anchor carrier.

In one exemplary embodiment, the method further includes: the network device broadcasts second indication information to the terminal, where the second indication information is used for instructing the terminal to perform the random access on a second non-anchor carrier, or a second uplink non-anchor carrier, or the second non-anchor carrier and the second uplink non-anchor carrier;

alternatively, the network device broadcasts fourth indication information to the terminal, where the fourth indication information is used for instructing the terminal to perform the random access on a second anchor carrier;

alternatively, the network device broadcasts sixth indication information to the terminal, where the sixth indication information is used for instructing the terminal to perform the random access on the second anchor carrier, the second non-anchor carrier, or the second uplink non-anchor carrier, where the second non-anchor carrier includes at least one non-anchor carrier in the non-anchor carrier configuration or the random access carrier configuration, the second uplink non-anchor carrier includes at least one uplink non-anchor carrier in the non-anchor carrier configuration or the random access carrier configuration, the second anchor carrier includes at least one anchor carrier in an anchor carrier list broadcast by the network device; or alternatively, the network device broadcasts eighth indication information to the terminal, where the eighth indication information is used for indicating whether resources for performing the random access used by the terminal include the anchor carrier.

In one exemplary embodiment, the method further includes: the network device broadcasts a carrier configuration monitored for receiving the PDCCH channel corresponding to each radio coverage level to the terminal. The carrier configuration monitored for receiving the PDCCH channel at least includes one of or any combination of: a carrier frequency point, a carrier frequency point list, an anchor carrier frequency point, an anchor carrier frequency point list, a non-anchor carrier frequency point, the non-anchor carrier frequency point list, a downlink non-anchor carrier frequency point, the downlink non-anchor carrier frequency point list, a carrier sequence number, a carrier sequence number list, an anchor carrier sequence number, an anchor carrier sequence number list, a non-anchor carrier sequence number, a non-anchor carrier sequence number list, a downlink non-anchor carrier frequency point sequence number, and a downlink non-anchor carrier frequency point sequence number list. The carrier frequency point includes the anchor carrier frequency point and the non-anchor carrier frequency point, and the carrier frequency point list includes the anchor carrier frequency point list and the non-anchor carrier frequency point list.

In one exemplary embodiment, each item of each of the non-anchor carrier configuration parameter list, the uplink non-anchor carrier configuration parameter list, and the downlink non-anchor carrier configuration parameter list includes: other physical layer parameters.

In one exemplary embodiment, the non-anchor carrier random access resource configuration list at least includes a random access resource configuration item corresponding to the radio coverage level.

In one exemplary embodiment, if the non-anchor carrier configuration does not include the random access resource configuration, the default configuration is that the non-anchor carrier random access resource configuration is the same as the anchor carrier random access resource configuration.

In one exemplary embodiment, different non-anchor carriers have a same random access resource configuration or have different a random access resource configurations.

In one exemplary embodiment, the other physical layer parameters include at least one of or any combination of: a downlink subframe configuration, a downlink transmission gap configuration, a size of evolved universal terrestrial radio access (E-UTRA) control region in an in-band operation mode.

In an exemplary embodiment, the method may further include:

the network device broadcasts by a difference between a non-anchor carrier radio coverage level RSRP threshold and an anchor carrier radio coverage level RSRP threshold to the terminal.

Figure 3:
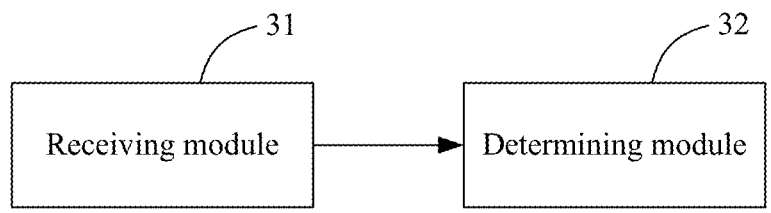
FIG. 3 is a schematic diagram of modules in a device for obtaining a network system resource configuration according to an embodiment of the present disclosure.

FIG. 3 is a schematic diagram of modules in a device for obtaining a network system resource configuration according to an embodiment of the present disclosure. As shown in FIG. 3, the device for obtaining the network system resource configuration includes a receiving module 31 and a determining module 32. The device for obtaining the network system resource configuration may be integrated in a terminal device or provided separately.

The receiving module 31 is configured to receive a non-anchor carrier configuration broadcast by a network device. The non-anchor carrier configuration includes at least one of or any combination of: a non-anchor carrier frequency point list, a non-anchor carrier configuration parameter list, an uplink non-anchor carrier frequency point list, an uplink non-anchor carrier configuration parameter list, a downlink non-anchor carrier frequency point list and a downlink non-anchor carrier configuration parameter list.

The determining module 32 is configured to determine, according to the non-anchor carrier configuration, resource information for performing random access or monitoring pages with the network device.

In this embodiment, the device for obtaining the network system resource configuration receives the non-anchor carrier configuration broadcast by the network device. The non-anchor carrier configuration includes at least one of or any combination of: the non-anchor carrier frequency point list, the non-anchor carrier configuration parameter list, the uplink non-anchor carrier frequency point list, the uplink non-anchor carrier configuration parameter list, the downlink non-anchor carrier frequency point list and the downlink non-anchor carrier configuration parameter list. The terminal determines, according to the non-anchor carrier configuration, the resource information for performing the random access or monitoring pages with the network device. In this way, the terminal performs the random access and monitoring pages on the non-anchor carrier, thereby improving the ability of the paging and random access capacity of the network device.

In one exemplary embodiment, the non-anchor carrier configuration further includes at least one of or any combination of:

a random access resource configuration list for non-anchor carriers, a RSRP threshold for radio coverage level list for the non-anchor carriers and a RSRP threshold for radio coverage level list for downlink non-anchor carriers.

In one exemplary embodiment, the receiving module 31 is configured to receive a random access carrier configuration broadcast by the network device and corresponding to each radio coverage level. The random access carrier configuration further includes at least one of or any combination of: a carrier frequency point, a carrier frequency point list, an anchor carrier frequency point, an anchor carrier frequency point list, a non-anchor carrier frequency point, the non-anchor carrier frequency point list, an uplink non-anchor carrier frequency point, the uplink non-anchor carrier frequency point list, a carrier sequence number, a carrier sequence number list, an anchor carrier sequence number, an anchor carrier sequence number list, a non-anchor carrier sequence number, a non-anchor carrier sequence number list, an uplink non-anchor carrier frequency point sequence number, an uplink non-anchor carrier frequency point sequence number list, random access resource configurations corresponding to the above frequency points or frequency point lists. The carrier frequency point comprises the anchor carrier frequency point and the non-anchor carrier frequency point, and the carrier frequency point list includes the anchor carrier frequency point list and the non-anchor carrier frequency point list.

In an exemplary embodiment, the receiving module 31 is further configured to obtain first indication information broadcast by the network device, where the first indication information is used for instructing the terminal to monitor pages on a first non-anchor carrier, or a first downlink non-anchor carrier, or the first non-anchor carrier and the first downlink non-anchor carrier.

Alternatively, the receiving module 31 is further configured to obtain third indication information broadcast by the network device, where the third indication information is used for instructing the terminal to monitoring pages on a first anchor carrier.

Alternatively, the receiving module 31 is further configured to obtain fifth indication information broadcast by the network device, where the fifth indication information is used for instructing the terminal to monitor pages on the first anchor carrier, the first non-anchor carrier, or the first downlink non-anchor carrier, where the first non-anchor carrier includes at least one non-anchor carrier in the non-anchor carrier configuration, and the first downlink non-anchor carrier includes at least one downlink anchor carrier in the non-anchor carrier configuration; the first anchor carrier includes at least one anchor carrier in an anchor carrier list broadcast by a system.

Alternatively, the receiving module 31 is further configured to obtain seventh indication information broadcast by the network device, where the seventh indication information is used for indicating whether resources used by the terminal for monitoring pages include the anchor carrier.

In one exemplary embodiment, the receiving module 31 is further configured to obtain second indication information broadcast by the network device, where the second indication information is used for instructing the terminal to perform the random access on a second non-anchor carrier, or a second uplink non-anchor carrier, or the second non-anchor carrier and the second uplink non-anchor carrier.

Alternatively, the receiving module 31 is further configured to obtain fourth indication information broadcast by the network device, where the fourth indication information is used for instructing the terminal to perform the random access on a second anchor carrier.

Alternatively, the receiving module 31 is further configured to obtain sixth indication information broadcast by the network device, where the sixth indication information is used for instructing the terminal to perform the random access on the second anchor carrier, the second non-anchor carrier, or the second uplink non-anchor carrier. The second non-anchor carrier includes at least one non-anchor carrier in the non-anchor carrier configuration or the random access carrier configuration, the second uplink non-anchor carrier includes at least one uplink non-anchor carrier in the non-anchor carrier configuration or the random access carrier configuration, and the second anchor carrier includes at least one anchor carrier in an anchor carrier list broadcast by the network device; or Alternatively, the receiving module 31 is further configured to obtain eighth indication information broadcast by the network device, where the eighth indication information is used for indicating whether resources for performing the random access used by the terminal include the anchor carrier.

In one exemplary embodiment, the receiving module 31 is configured to receive a carrier configuration corresponding to each radio coverage level and broadcast by the network device, where the carrier configuration is monitored for receiving a PDCCH channel. The carrier configuration monitored for receiving the PDCCH channel at least includes one of or any combination of: a carrier frequency point, a carrier frequency point list, an anchor carrier frequency point, an anchor carrier frequency point list, the non-anchor carrier frequency point, the non-anchor carrier frequency point list, a downlink non-anchor carrier frequency point, a downlink non-anchor carrier frequency point list, a carrier sequence number, a carrier sequence number list, an anchor carrier sequence number, an anchor carrier sequence number list, a non-anchor carrier sequence number, a non-anchor carrier sequence number list, a downlink non-anchor carrier frequency point sequence number, and a downlink non-anchor carrier frequency point sequence number list. The carrier frequency point includes the anchor carrier frequency point and the non-anchor carrier frequency point, and the carrier frequency point list includes the anchor carrier frequency point list and the non-anchor carrier frequency point list.

In one exemplary embodiment, the receiving module 31 is configured to determine, according to a preset algorithm, to select a jth carrier to monitor and receive a PDCCH channel in a carrier configuration monitored for receiving the PDCCH channel when the terminal selects an ith carrier to initiate the random access in a random access carrier configuration.

The preset algorithm may include:

$$j = \begin{cases} Npd/i, & \text{if } Npd > Npa \\ (i \bmod Npd) + 1, & \text{if } Npd \leq Npa \end{cases}$$

Npd is a total number of carriers in the carrier configuration monitored for receiving the PDCCH channel, Npa is a total number of the carriers in the random access carrier configuration, and a minimum value of i and a minimum value of j are 1.

The preset algorithm may include:

$j=(i+N_{offset})$ mod Npd, where $N_{offset}$ is a preset value or a constant, Npd is a total number of carriers in the carrier configuration monitored for receiving the PDCCH channel, Npa is a total number of the carriers in the random access carrier configuration, and the minimum value of i and the minimum value of j are 1.

The preset algorithm may include:
if Npd=Npa, let j=i,
if Npd≠Npa, let $j=(i+N_{offset})$ mod Npd, and $N_{offset}$ is a preset value or a constant. Npd is a total number of carriers in the carrier configuration monitored for receiving the PDCCH channel, Npa is a total number of the carriers in the random access carrier configuration, and the minimum value of i and the minimum value of j are 1.

The preset algorithm may include:
if Npd=Npa, let j=i
if Npd≠Npa, let $$j = \begin{cases} Npd/i, & \text{if } Npd > Npa \\ (i \bmod Npd) + 1, & \text{if } Npd < Npa \end{cases}.$$

Npd is a total number of carriers in the carrier configuration monitored for receiving the PDCCH channel, Npa is a total number of the carriers in the random access carrier configuration, and the minimum value of i and the minimum value of j are 1.

The receiving module 31 is configured to receive information on a correspondence between a carrier configuration monitored for the receiving PDCCH channel and an uplink carrier configuration corresponding to any one of: each non-anchor carrier and each radio coverage level, where the information on the correspondence is broadcast by the network device.

The uplink carrier configuration includes at least one of or any combination of: a carrier frequency point, a carrier frequency point list, an anchor carrier frequency point, an anchor carrier frequency point list, a non-anchor carrier frequency point, the non-anchor carrier frequency point list, an uplink non-anchor carrier frequency point, the uplink non-anchor carrier frequency point list, a carrier sequence number, a carrier sequence number list, an anchor carrier sequence number, an anchor carrier sequence number list, a non-anchor carrier sequence number, a non-anchor carrier sequence number list, an uplink non-anchor carrier frequency point sequence number, an uplink non-anchor carrier frequency point sequence number list.

The carrier configuration monitored for receiving the PDCCH channel includes at least one of or any combination of: the carrier frequency point, the carrier frequency point list, the anchor carrier frequency point, the anchor carrier frequency point list, the non-anchor carrier frequency point, the non-anchor carrier frequency point list, a downlink non-anchor carrier frequency point, a downlink non-anchor carrier frequency point list, the carrier sequence number, the carrier sequence number list, the anchor carrier sequence number, the anchor carrier sequence number list, the non-anchor carrier sequence number, the non-anchor carrier sequence number list, a downlink non-anchor carrier frequency point sequence number, a downlink non-anchor carrier frequency point sequence number list.

When the terminal selects a certain uplink carrier to initiate the random access, the terminal selects, according to the correspondence, the carrier configuration monitored for receiving the PDCCH channel and corresponding to the uplink carrier to monitor and receive the PDCCH channel. The correspondence includes at least one of or any combination of:

a correspondence in which one uplink carrier configuration corresponds to one carrier configuration monitored for receiving the PDCCH channel;

a correspondence in which the one uplink carrier configuration corresponds to multiple carrier configurations monitored for receiving the PDCCH channel, where the multiple carrier configurations monitored for receiving the PDCCH channel are represented in a Bitmap form, a preset value 1 in a Bitmap represents a carrier corresponding to the uplink carrier configuration, and a preset value 2 in the Bitmap represents a carrier not corresponding to the uplink carrier configuration; and a correspondence in which multiple uplink carrier configurations correspond to one carrier configuration monitored for receiving the PDCCH channel, where the multiple uplink carrier configurations are represented in the Bitmap form, a preset value 1 in a Bitmap represents a carrier corresponding to the carrier configuration monitored for receiving the PDCCH channel, and a preset value 2 in the Bitmap represents a carrier not corresponding to the carrier configuration monitored for receiving the PDCCH channel.

In one exemplary embodiment, each item of each of the non-anchor carrier configuration parameter list, the uplink non-anchor carrier configuration parameter list, and the downlink non-anchor carrier configuration parameter list includes: other physical layer parameters.

In one exemplary embodiment, the random access resource configuration list for the non-anchor carrier at least includes a random access resource configuration item corresponding to the radio coverage level.

In one exemplary embodiment, if the non-anchor carrier configuration does not include the random access resource configuration, a default configuration is that the random access resource configuration for the non-anchor carrier is the same with the random access resource configuration for the anchor carrier.

In one exemplary embodiment, different non-anchor carriers have a same random access resource configuration or have different random access resource configurations.

In one exemplary embodiment, the other physical layer parameters include at least one of or any combination of: a downlink subframe configuration, a downlink transmission gap configuration, a size of evolved universal terrestrial radio access (E-UTRA) control region in an in-band operation mode.

In one exemplary embodiment, the receiving module 31 is further configured to receive a difference between a RSRP threshold for radio coverage level list for the non-anchor carrier and a RSRP threshold for radio coverage level list for the anchor carrier, where the difference is broadcast by the network device.

The random access resource configuration for the non-anchor carrier at least includes a random access resource parameter. Different non-anchor carriers and/or anchor carriers are configured with different random access resource parameters. In this way, each non-anchor carrier and/or anchor carrier is configured with a unique access capacity, or each non-anchor carrier and/or anchor carrier is configured with a unique access probability or access possibility. For example, different non-anchor carriers are configured with different number of subcarriers, in this way, different non-anchor carriers are indirectly configured with different access capacities, or different non-anchor carriers are indirectly configured with different access probabilities or access possibilities. For the non-anchor carrier configured with more subcarriers, the terminal will select the non-anchor carrier with a greater probability in a random access process, while the terminal will select the non-anchor carrier with less subcarriers in a smaller probability in the random access process. For another example, different non-anchor carriers are configured with random access periods with different lengths. For the non-anchor carrier configured with a longer random access period, the terminal will select the non-anchor carrier with a greater probability in the random access process, while the terminal will select the non-anchor carrier with a shorter random access period in a smaller probability in the random access process. In one exemplary embodiment, the value range of the subcarrier quantity is expanded on the basis of a current value range. For example, the value range expands to the following values {n12, n16, n20, n24, n28, n32, n36, n40, n44, n48}. In one exemplary embodiment, the values of the random access parameters configured for different non-anchor carriers and/or anchor carriers are in a ratio relationship, and the ration relationship may represent a ratio relationship of selecting probabilities of the different non-anchor carriers and/or anchor carriers by the terminal in the random access process.

Figure 4:
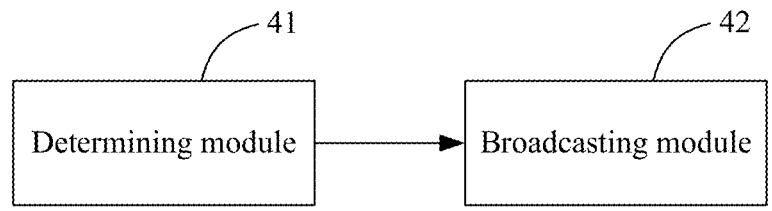
FIG. 4 is a schematic diagram of modules in a device for transmitting a network system resource configuration according to an embodiment of the present disclosure.

FIG. 4 is a schematic diagram of modules in a device for transmitting a network system resource configuration according to an embodiment of the present disclosure. As shown in FIG. 4, the device for transmitting the network system resource configuration includes a determining module 41 and a broadcasting module 42. The device for transmitting the network system resource configuration may be integrated in a network device or provided separately.

The determining module 41 is configured to determine a non-anchor carrier configuration to be broadcast to a terminal, where the non-anchor carrier configuration includes at least one of or any combination of: a non-anchor carrier frequency point list, a non-anchor carrier configuration parameter list, an uplink non-anchor carrier frequency point list, an uplink non-anchor carrier configuration parameter list, a downlink non-anchor carrier frequency point list and a downlink non-anchor carrier configuration parameter list.

The broadcasting module 42 is configured to broadcast the non-anchor carrier configuration to the terminal.

In this embodiment, the device for transmitting the network system resource configuration determines the non-anchor carrier configuration broadcast to the terminal. The non-anchor carrier configuration includes at least one of or any combination of: the non-anchor carrier frequency point list, the non-anchor carrier configuration parameter list, the uplink non-anchor carrier frequency point list, the uplink non-anchor carrier configuration parameter list, the downlink non-anchor carrier frequency point list and the downlink non-anchor carrier configuration parameter list. The network device broadcasts the non-anchor carrier configuration to the terminal. In this way, the terminal can perform the random access and monitoring pages on the non-anchor carrier, thereby improving the ability of the paging and random access capacity of the network device.

In one exemplary embodiment, the non-anchor carrier configuration further includes at least one of or any combination of:

a random access resource configuration list for non-anchor carriers, a RSRP threshold for radio coverage level list for the non-anchor carriers and a RSRP threshold for radio coverage level list for downlink non-anchor carriers.

The determining module 41 is further configured to determine, according to a preset algorithm, to select a jth carrier to monitor and receive a PDCCH channel in the carrier configuration monitored for receiving the PDCCH channel and having the correspondence when the terminal selects an ith carrier to initiate the random access in the uplink carrier configuration.

The preset algorithm may include:
if $Npd=Npa$, let $j=i$,
if $Npd \neq Npa$, let $j=(i+k0*Ns) \mod Npd+N0$, Npd is a total number of carriers in the carrier configuration monitored for receiving the PDCCH channel and having the correspondence, Npa is a total number of the carriers in the random access carrier configuration, or the Npa is a total number of the carriers in the uplink carrier configuration, Ns is a subcarrier identity factor of the ith carrier in the random access carrier configuration or a function of the subcarrier identity factor, or Ns is a current coverage level factor of the terminal or a function of the current coverage level factor, k0 and N0 are preset constants.

If $Npd=Npa$, let $j=i$,
If $Npd \neq Npa$, effective values of Ns on the ith carrier are divided into Npd segments, and the Npd segments are identified as M1, M2, . . . MNpd in an ascending order. When the terminal initiates the random access on the ith carrier, the terminal selects the carrier monitored for receiving the PDCCH channel according to which one of the Npd segments the value of Ns in a selected random access resource falls into. For example, the value of Ns in the selected random access resource falls into a Mjth segment, the jth carrier is selected as the carrier monitored for receiving the PDCCH channel.

Npd is a total number of carriers in the carrier configuration monitored for receiving the PDCCH channel and having the correspondence, Npa is a total number of the carriers in the random access carrier configuration, or the Npa is a total number of the carriers in the uplink carrier configuration, Ns is a subcarrier identity factor in the random access carrier configuration or a function of the subcarrier identity factor, or Ns is a current coverage level factor of the terminal or a function of the current coverage level factor.

If $Npd=Npa$, let $j=i$,
If $Npd \neq Npa$, let $j=(i+k1*T) \mod Npd+N1$,

Npd is a total number of carriers in the carrier configuration monitored for receiving the PDCCH channel and having the correspondence, Npa is a total number of the carriers in the random access carrier configuration, or the Npa is a total number of the carriers in the uplink carrier configuration, T is a time domain factor, and k1 and N1 are preset constants.

If $Npd=Npa$, let $j=i$,
If $Npd \neq Npa$, let $j=(i+k3*Ns+k4*T) \mod Npd+N3$,

Npd is a total number of carriers in the carrier configuration monitored for receiving the PDCCH channel and having the correspondence, Npa is a total number of the carriers in the random access carrier configuration, or the Npa is a total number of the carriers in the uplink carrier configuration, Ns is a subcarrier identity factor in the random access carrier configuration or a function of the subcarrier identity factor, or Ns is a current coverage level factor of the terminal or a function of the current coverage level factor. T is a time domain factor.

k3, k4 and N3 are preset constants. Preferably, k3 is the maximum value of i, and k4 is the maximum value of the calculation result of $(i+k3*Ns)$.

Alternatively,
If $Npd \neq Npa$, let $j=(i+k3*T+k4*Ns) \mod Npd+N3$.

Npd is a total number of carriers in the carrier configuration monitored for receiving the PDCCH channel and having the correspondence, Npa is a total number of the carriers in the random access carrier configuration, or the Npa is a total number of the carriers in the uplink carrier configuration, Ns is a subcarrier identity factor in the random access carrier configuration or a function of the subcarrier identity factor, or Ns is a current coverage level factor of the terminal or a function of the current coverage level factor. T is a time domain factor.

k3, k4 and N3 are preset constants. Preferably, k3 is the maximum value of i, and k4 is the maximum value of the calculation result of $(i+k3*T)$.

In one exemplary embodiment, the broadcasting module 42 is configured to broadcast a random access carrier configuration corresponding to each radio coverage level to the terminal. The random access carrier configuration further includes at least one of or any combination of: a carrier frequency point, a carrier frequency point list, an anchor carrier frequency point, an anchor carrier frequency point list, a non-anchor carrier frequency point, the non-anchor carrier frequency point list, an uplink non-anchor carrier frequency point, the uplink non-anchor carrier frequency point list, a carrier sequence number, a carrier sequence number list, an anchor carrier sequence number, an anchor carrier sequence number list, a non-anchor carrier sequence number, a non-anchor carrier sequence number list, an uplink non-anchor carrier frequency point sequence number, an uplink non-anchor carrier frequency point sequence number list, and random access resource configurations corresponding to the above frequency points or frequency point lists. The carrier frequency point includes the anchor carrier frequency point and the non-anchor carrier frequency point, and the carrier frequency point list includes the anchor carrier frequency point list and the non-anchor carrier frequency point list.

In one exemplary embodiment, the broadcasting module 42 is configured to broadcast first indication information to the terminal, where the first indication information is used for instructing the terminal to monitor pages on a first non-anchor carrier, or a first downlink non-anchor carrier, or the first non-anchor carrier and the first downlink non-anchor carrier.

Alternatively, the broadcasting module 42 is configured to broadcast third indication information to the terminal, where the third indication information is used for instructing the terminal to monitor pages on a first anchor carrier.

Alternatively, the broadcasting module 42 is configured to broadcast fifth indication information to the terminal, where the fifth indication information is used for instructing the terminal to monitor pages on the first anchor carrier, the first non-anchor carrier, or the first downlink non-anchor carrier. The first non-anchor carrier includes at least one non-anchor carrier in the non-anchor carrier configuration, the first downlink non-anchor carrier includes at least one downlink non-anchor carrier in the non-anchor carrier configuration, and the first anchor carrier includes at least one anchor carrier in an anchor carrier list broadcast by a system.

Alternatively, the broadcasting module 42 is configured to broadcast seventh indication information to the terminal, where the seventh indication information is used for indicating whether resources used by the terminal for monitoring pages include the anchor carrier.

In one exemplary embodiment, the broadcasting module 42 is further configured to broadcast second indication information to the terminal, where the second indication information is used for instructing the terminal to perform the random access on a second non-anchor carrier, or a second uplink non-anchor carrier, or the second non-anchor carrier and the second uplink non-anchor carrier.

Alternatively, the broadcasting module 42 is configured to broadcast fourth indication information to the terminal, where the fourth indication information is used for instructing the terminal to perform the random access on a second anchor carrier.

Alternatively, the broadcasting module 42 is configured to broadcast sixth indication information to the terminal, where the sixth indication information is used for instructing the terminal to perform the random access on the second anchor carrier, the second non-anchor carrier, or the second uplink non-anchor carrier. The second non-anchor carrier includes at least one non-anchor carrier in the non-anchor carrier configuration or the random access carrier configuration, the second uplink non-anchor carrier includes at least one uplink non-anchor carrier in the non-anchor carrier configuration or the random access carrier configuration, the second anchor carrier includes at least one anchor carrier in an anchor carrier list broadcast by the network device.

Alternatively, the broadcasting module 42 is configured to broadcast eighth indication information to the terminal, where the eighth indication information is used for indicating whether resource for performing the random access used by the terminal include the anchor carrier.

In one exemplary embodiment, the broadcasting module 42 is configured to broadcast a carrier configuration monitored for receiving the PDCCH channel and corresponding to each radio coverage level to the terminal. The carrier configuration monitored for receiving the PDCCH channel at least includes one of or any combination of: a carrier frequency point, a carrier frequency point list, an anchor carrier frequency point, an anchor carrier frequency point list, a non-anchor carrier frequency point, the non-anchor carrier frequency point list, a downlink non-anchor carrier frequency point, the downlink non-anchor carrier frequency point list, a carrier sequence number, a carrier sequence number list, an anchor carrier sequence number, an anchor carrier sequence number list, a non-anchor carrier sequence number, a non-anchor carrier sequence number list, a downlink non-anchor carrier frequency point sequence number, and a downlink non-anchor carrier frequency point sequence number list. The carrier frequency point includes the anchor carrier frequency point and the non-anchor carrier frequency point, and the carrier frequency point list includes the anchor carrier frequency point list and the non-anchor carrier frequency point list.

In one exemplary embodiment, each item of each of the non-anchor carrier configuration parameter list, the uplink non-anchor carrier configuration parameter list, and the downlink non-anchor carrier configuration parameter list includes: other physical layer parameters.

In one exemplary embodiment, the random access resource configuration list for the non-anchor carrier at least includes a random access resource configuration item corresponding to the radio coverage level.

In one exemplary embodiment, if the non-anchor carrier configuration does not include the random access resource configuration, a default configuration is that the random access resource configuration for the non-anchor carrier is the same as the random access resource configuration for the anchor carrier.

In one exemplary embodiment, different non-anchor carriers are configured with a same random access resource configuration or configured with different random access resource configurations.

In one exemplary embodiment, the other physical layer parameters include at least one of or any combination of: a downlink subframe configuration, a downlink transmission gap configuration, a size of evolved universal terrestrial radio access (E-UTRA) control region in an in-band operation mode.

In an exemplary embodiment, the broadcasting module 42 is configured to broadcast to the terminal a difference between a RSRP threshold for radio coverage level list for the non-anchor carrier and a RSRP threshold for radio coverage level list for the anchor carrier.

An embodiment of the present disclosure provides a network system, which includes: the device for obtaining a network system resource configuration described above and the device for transmitting the network system resource configuration described above.

It will be understood by those skilled in the art that functional modules/units in all or part of the steps of the method, the system and the apparatus disclosed above may be implemented as software, firmware, hardware and appropriate combinations thereof. In the hardware implementation, the division of the functional modules/units mentioned in the above description may not correspond to the division of physical components. For example, one physical component may have several functions, or one function or step may be executed jointly by several physical components. Some or all components may be implemented as software executed by processors such as digital signal processors or microcontrollers, hardware, or integrated circuits such as application specific integrated circuits. Such software may be distributed on a computer-readable medium, which may include a computer storage medium (or a non-transitory medium) and a communication medium (or a transitory medium). As is known to those skilled in the art, the term, computer storage medium, includes volatile and nonvolatile, removable and non-removable medium implemented in any method or technology for storing information (such as computer-readable instructions, data structures, program modules or other data). The computer storage medium includes, but is not limited to, a RAM, a ROM, an EEPROM, a flash memory or other memory technologies, a CD-ROM, a digital versatile disc (DVD) or other optical disc storage, a magnetic cassette, a magnetic tape, a magnetic disk storage or other magnetic storage apparatuses, or any other medium used for storing desired information and accessed by a computer. In addition, as is known to those skilled in the art, the communication medium generally includes computer-readable instructions, data structures, program modules or other data in modulated data signals such as carriers or other transmission mechanisms, and may include any information delivery medium.

Figure 5:
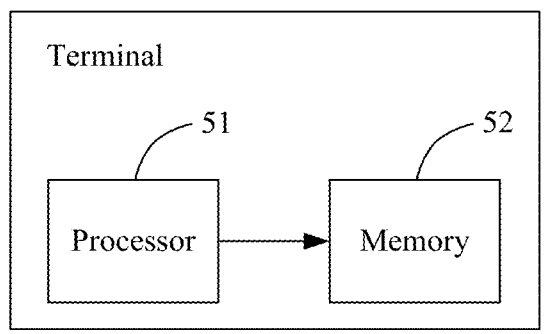
FIG. 5 is a structural diagram of a terminal according to an embodiment of the present disclosure.

FIG. 5 is a structural diagram of a terminal according to an embodiment of the present disclosure. As shown in FIG. 5, the terminal provided by the embodiment of the present disclosure includes a processor 51 and a memory 52 storing instructions executable by the terminal. The memory 52 may include at least one type of storage medium. The storage medium includes a flash, a hard disk, a multimedia card, a card-type (such as SD or DX memory), a random access memory (RAM), a static random-access memory (SRAM), a read-only memory (ROM), a erasable programmable read only memory (EEPROM), a programmable read-only memory (PROM), a magnetic memory, a magnetic disk and an optical disk.

When the instructions are executed by the processor, the following operations are further executed:

receiving a non-anchor carrier configuration broadcast by a network device, where the non-anchor carrier configuration includes at least one of or any combination of: a non-anchor carrier frequency point list, a non-anchor carrier configuration parameter list, an uplink non-anchor carrier frequency point list, an uplink non-anchor carrier configuration parameter list, a downlink on-anchor carrier frequency point list and a downlink non-anchor carrier configuration parameter list;

determining, according to the non-anchor carrier configuration, resource information for performing random access or monitoring pages with the network device.

In this embodiment, the terminal can perform random access and monitoring pages on the non-anchor carrier, thereby improving the ability of the paging and random access capacity of the network device.

In one exemplary embodiment, the non-anchor carrier configuration further includes at least one of or any combination of:

a random access resource configuration list for non-anchor carriers, a RSRP threshold for radio coverage level list for the non-anchor carriers and a RSRP threshold for radio coverage level list for downlink non-anchor carriers.

In one exemplary embodiment, the processor 51 further executes the following operations:

receiving a random access carrier configuration broadcast by the network device and corresponding to each radio coverage level. The random access carrier configuration further includes at least one of or any combination of: a carrier frequency point, a carrier frequency point list, an anchor carrier frequency point, an anchor carrier frequency point list, the non-anchor carrier frequency point, the non-anchor carrier frequency point list, an uplink non-anchor carrier frequency point, the uplink non-anchor carrier frequency point list, a carrier sequence number, a carrier sequence number list, an anchor carrier sequence number, an anchor carrier sequence number list, a non-anchor carrier sequence number, a non-anchor carrier sequence number list, an uplink non-anchor carrier frequency point sequence number, an uplink non-anchor carrier frequency point sequence number list, and random access resource configurations corresponding to the above frequency points or frequency point lists. The carrier frequency point includes the anchor carrier frequency point and the non-anchor carrier frequency point, and the carrier frequency point list includes the anchor carrier frequency point list and the non-anchor carrier frequency point list.

In one exemplary embodiment, the processor 51 further executes the following operations:

obtaining first indication information broadcast by the network device, where the first indication information is used for instructing the terminal to monitor pages on a first non-anchor carrier, or a first downlink non-anchor carrier, or the first non-anchor carrier and the first downlink non-anchor carrier;

alternatively, obtaining third indication information broadcast by the network device, where the third indication information is used for instructing the terminal to monitor pages on a first anchor carrier;

alternatively, obtaining fifth indication information broadcast by the network device, where the fifth indication information is used for instructing the terminal to monitor pages on the first anchor carrier, the first non-anchor carrier, or the first downlink non-anchor carrier, where the first non-anchor carrier includes at least one non-anchor carrier in the non-anchor carrier configuration, and the first downlink non-anchor carrier includes at least one downlink anchor carrier in the non-anchor carrier configuration; the first anchor carrier includes at least one anchor carrier in an anchor carrier list broadcast by a system;

alternatively, obtaining seventh indication information broadcast by the network device, where the seventh indication information is used for indicating whether resources used by the terminal for monitoring pages include the anchor carrier.

In one exemplary embodiment, the processor 51 further executes the following operations: obtaining second indication information broadcast by the network device, where the second indication information is used for instructing the terminal to perform the random access on a second non-anchor carrier, or a second uplink non-anchor carrier, or the second non-anchor carrier and the second uplink non-anchor carrier;

alternatively, obtaining fourth indication information broadcast by the network device, where the fourth indication information is used for instructing the terminal to perform the random access on a second anchor carrier;

alternatively, obtaining sixth indication information broadcast by the network device, where the sixth indication information is used for instructing the terminal to perform the random access on the second anchor carrier, the second non-anchor carrier, or the second uplink non-anchor carrier, where the second non-anchor carrier includes at least one non-anchor carrier in the non-anchor carrier configuration or the random access carrier configuration, the second uplink non-anchor carrier includes at least one uplink non-anchor carrier in the non-anchor carrier configuration or the random access carrier configuration, and the second anchor carrier includes at least one anchor carrier in an anchor carrier list broadcast by the network device;

alternatively, obtaining eighth indication information broadcast by the network device, where the eighth indication information is used for indicating whether resource for performing the random access used by the terminal include the anchor carrier.

In one exemplary embodiment, the processor 51 further executes the following operations: receiving a carrier configuration broadcast by the network device and monitored for receiving the PDCCH channel corresponding to each radio coverage level. The carrier configuration monitored for receiving the PDCCH channel at least includes one of or any combination of: a carrier frequency point, a carrier frequency point list, an anchor carrier frequency point, an anchor carrier frequency point list, the non-anchor carrier frequency point, the non-anchor carrier frequency point list, a downlink non-anchor carrier frequency point, a downlink non-anchor carrier frequency point list, a carrier sequence number, a carrier sequence number list, an anchor carrier sequence number, an anchor carrier sequence number list, a non-anchor carrier sequence number, a non-anchor carrier sequence number list, a downlink non-anchor carrier frequency point sequence number, a downlink non-anchor carrier frequency point sequence number list. The carrier frequency point includes the anchor carrier frequency point and the non-anchor carrier frequency point, and the carrier frequency point list includes the anchor carrier frequency point list and the non-anchor carrier frequency point list.

In one exemplary embodiment, the processor 51 further executes the following operations:

determining, according to a preset algorithm, to select a jth carrier to monitor and receive a PDCCH channel in a carrier configuration monitored for receiving the PDCCH channel when the terminal selects an ith carrier to initiate the random access in a random access carrier configuration.

In one exemplary embodiment, the preset algorithm further includes:

$$j = \begin{cases} Npd/i, & \text{if } Npd > Npa \\ (i \bmod Npd) + 1, & \text{if } Npd \leq Npa \end{cases}$$

Npd is a total number of carriers in the carrier configuration monitored for receiving the PDCCH channel, Npa is a total number of the carriers in the random access carrier configuration, and the minimum value of i and the minimum value of j are 1.

In one exemplary embodiment, the preset algorithm further includes:

$j=(i+N_{offset})$ mod Npd, where $N_{offset}$ is a preset value or a constant, Npd is a total number of carriers in the carrier configuration monitored for receiving the PDCCH channel, Npa is a total number of the carriers in the random access carrier configuration, and the minimum value of i and the minimum value of j are 1.

In one exemplary embodiment, the preset algorithm further includes:

If Npd=Npa, let j=i,

If Npd≠Npa, let $j=(i+N_{offset})$ mod Npd, and $N_{offset}$ is a preset value or a constant. Npd is a total number of carriers in the carrier configuration monitored for receiving the PDCCH channel, Npa is a total number of the carriers in the random access carrier configuration, and the minimum value of i and the minimum value of j are 1.

In one exemplary embodiment, the preset algorithm further includes:

if Npd=Npa, let j=i, if Npd≠Npa, let j=, Npd is a total number of carriers in the carrier configuration monitored for receiving the PDCCH channel, Npa is a total number of the carriers in the random access carrier configuration, and the minimum value of i and the minimum value of j are 1.

It is to be noted that various implementation modes described here may be implemented by using a computer-readable media such as software, hardware, or a combination thereof. For the hardware implementation, the implementation mode described here may be implemented by using at least one of an application specific integrated circuit (ASIC), a digital signal processor (DSP), a digital signal processing device (DSPD), a programmable logic device (PLD), a field programmable gate array (FPGA), a processor, a controller, a microcontroller and a microprocessor and an electronic unit designed to execute functions described here. For the software implementation, the implementation mode of processes or functions may be implemented by a separate software module allowable to executed at least one of the functions or operations. Software codes may be implemented by a software application (or program) written in any suitable programming language, or may be stored in the memory 52 and executed by the controller.

Figure 6:
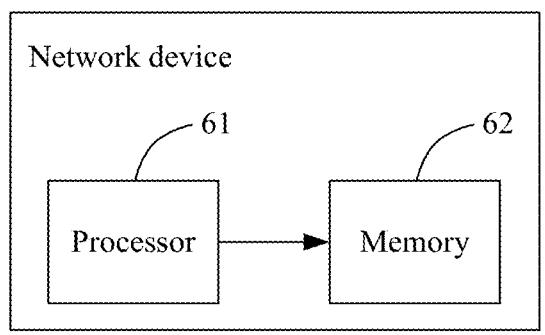
FIG. 6 is a structural diagram of a network device according to an embodiment of the present disclosure.

FIG. 6 is a structural diagram of a network device according to an embodiment of the present disclosure. As shown in FIG. 6, the network device provides by the embodiment of the present disclosure includes a processor 61 and a memory 62 storing instructions executable by the processor. The memory 62 may include at least one type of storage medium which includes a flash, a hard disk, a multimedia card, a card-type (such as SD or DX memory), a random access memory (RAM), a static random-access memory (SRAM), a read-only memory (ROM), a erasable programmable read only memory (EEPROM), a programmable read-only memory (PROM), a magnetic memory, a magnetic disk and an optical disk.

When the instructions are executed by the processor, the following operations are further executed:

determining a non-anchor carrier configuration to be broadcast to a terminal, where the non-anchor carrier configuration includes at least one of or any combination of: a non-anchor carrier frequency point list, a non-anchor carrier configuration parameter list, an uplink non-anchor carrier frequency point list, an uplink non-anchor carrier configuration parameter list, a downlink non-anchor carrier frequency point list and a downlink non-anchor carrier configuration parameter list; and broadcasting the non-anchor carrier configuration to the terminal.

In this embodiment, the random access and monitoring pages on the non-anchor carrier by the terminal is implemented, thereby improving the ability of the paging and random access capacity of the network device.

In one exemplary embodiment, the non-anchor carrier configuration further includes at least one of or any combination of:

a random access resource configuration list for non-anchor carriers, a RSRP threshold for radio coverage level list for the non-anchor carriers and a RSRP threshold for radio coverage level list for downlink non-anchor carriers.

In one exemplary embodiment, the processor 61 further executes the following operations:

broadcasting a random access carrier configuration corresponding to each radio coverage level to the terminal, where the random access carrier configuration further includes at least one of or any combination of: a carrier frequency point, a carrier frequency point list, an anchor carrier frequency point, an anchor carrier frequency point list, a non-anchor carrier frequency point, the non-anchor carrier frequency point list, an uplink non-anchor carrier frequency point, the uplink non-anchor carrier frequency point list, a carrier sequence number, a carrier sequence number list, an anchor carrier sequence number, an anchor carrier sequence number list, a non-anchor carrier sequence number, a non-anchor carrier sequence number list, an uplink non-anchor carrier frequency point sequence number, an uplink non-anchor carrier frequency point sequence number list, and random access resource configurations corresponding to the above frequency points or frequency point lists. The carrier frequency point includes the anchor carrier frequency point and the non-anchor carrier frequency point, and the carrier frequency point list includes the anchor carrier frequency point list and the non-anchor carrier frequency point list.

In one exemplary embodiment, the processor 61 further executes the following operations:

broadcasting first indication information to the terminal, where the first indication information is used for instructing the terminal to monitor pages on a first non-anchor carrier, or a first downlink non-anchor carrier, or the first non-anchor carrier and the first downlink non-anchor carrier;

alternatively, broadcasting third indication information to the terminal, where the third indication information is used for instructing the terminal to monitor pages on a first anchor carrier;

alternatively, broadcasting fifth indication information to the terminal, where the fifth indication information is used for instructing the terminal to monitor pages on the first anchor carrier, the first non-anchor carrier, or the first downlink non-anchor carrier, where the first non-anchor carrier includes at least one non-anchor carrier in the non-anchor carrier configuration, the first downlink non-anchor carrier includes at least one downlink non-anchor carrier in the non-anchor carrier configuration, and the first anchor carrier includes at least one anchor carrier in an anchor carrier list broadcast by a system;

alternatively, broadcasting, by the network device, seventh indication information to the terminal, where the seventh indication information is used for indicating whether resources used by the terminal for monitoring pages include the anchor carrier.

In one exemplary embodiment, the processor 61 further executes the following operations:

broadcasting second indication information to the terminal, where the second indication information is used for instructing the terminal to perform the random access on a second non-anchor carrier, or a second uplink non-anchor carrier, or the second non-anchor carrier and the second uplink non-anchor carrier;

alternatively, broadcasting fourth indication information to the terminal, where the fourth indication information is used for instructing the terminal to perform the random access on a second anchor carrier;

alternatively, broadcasting sixth indication information to the terminal, where the sixth indication information is used for instructing the terminal to perform the random access on the second anchor carrier, the second non-anchor carrier, or the second uplink non-anchor carrier, where the second non-anchor carrier includes at least one non-anchor carrier in the non-anchor carrier configuration or the random access carrier configuration, the second uplink non-anchor carrier includes at least one uplink non-anchor carrier in the non-anchor carrier configuration or the random access carrier configuration, the second anchor carrier includes at least one anchor carrier in an anchor carrier list broadcast by the network device;

alternatively, broadcasting eighth indication information to the terminal, where the eighth indication information is used for indicating whether resources for performing the random access used by the terminal include the anchor carrier.

In one exemplary embodiment, the processor 61 further executes the following operations: broadcasting a carrier configuration monitored for receiving the PDCCH channel corresponding to each radio coverage level to the terminal. The carrier configuration monitored for receiving the PDCCH channel at least includes one of or any combination of: a carrier frequency point, a carrier frequency point list, an anchor carrier frequency point, an anchor carrier frequency point list, the non-anchor carrier frequency point, the non-anchor carrier frequency point list, a downlink non-anchor carrier frequency point, a downlink non-anchor carrier frequency point list, a carrier sequence number, a carrier sequence number list, an anchor carrier sequence number, an anchor carrier sequence number list, a non-anchor carrier sequence number, a non-anchor carrier sequence number list, a downlink non-anchor carrier frequency point sequence number, and a downlink non-anchor carrier frequency point sequence number list. The carrier frequency point includes the anchor carrier frequency point and the non-anchor carrier frequency point, and the carrier frequency point list includes the anchor carrier frequency point list and the non-anchor carrier frequency point list.

In one exemplary embodiment, each item of each of the non-anchor carrier configuration parameter list, the uplink non-anchor carrier configuration parameter list, and the downlink non-anchor carrier configuration parameter list includes: other physical layer parameters.

In one exemplary embodiment, the random access resource configuration list for the non-anchor carriers at least includes a random access resource configuration item corresponding to the radio coverage level.

It is to be noted that various implementation modes described here may use a computer-readable media such as software, hardware, or a combination thereof to implement. For the hardware implementation, the implementation mode described here may use at least one of a application specific integrated circuit (ASIC), a digital signal processor (DSP), a digital signal processing device (DSPD), a programmable logic device (PLD), a field programmable gate array (FPGA), a processor, a controller, a microcontroller and a microprocessor and an electronic unit designed to execute functions described here to implement. For the software implementation, the implementation mode of processes or functions may be implemented by a separate software module allowable to executed at least one of the functions or operations. Software codes may be implemented by a software application (or program) written in any suitable programming language, or may be stored in the memory 52 and executed by the controller.

An embodiment of the present disclosure provides a network system, which includes the terminal described above and the network device described above.

Moreover, an embodiment of the present disclosure further provides a computer-readable storage medium configured to store computer-executable instructions. The instructions execute the method for obtaining a network system resource configuration when executed by a processor. An embodiment of the present disclosure further provides a computer-readable storage medium configured to store computer-executable instructions. The instructions execute the method for transmitting the network system resource configuration when executed by a processor.

The above description is the embodiments of the present disclosure and is not intended to limit the scope of the present disclosure. Those skilled in the art may make various modifications and changes in the forms and details of the embodiments, but the patent protection scope of the present application is still subject to the scope defined by the appended claims.

INDUSTRIAL APPLICABILITY

In embodiments of the present disclosure, a terminal receives a non-anchor carrier configuration broadcast by a network device, and determines according to the non-anchor carrier configuration, resource information for performing random access or monitoring pages with the network device. The non-anchor carrier configuration includes at least one of or any combination of a non-anchor carrier frequency point list, a non-anchor carrier configuration parameter list, an uplink non-anchor carrier frequency point list, an uplink non-anchor carrier configuration parameter list, a downlink non-anchor carrier frequency point list and a downlink non-anchor carrier configuration parameter list. In this way, the terminal can perform the random access and monitoring pages on the non-anchor carrier, thereby improving the ability of the paging and random access capacity of the network device.

What is claimed is:

1. A wireless communication method, comprising:
receiving, by a terminal, a non-anchor carrier configuration broadcast by a network device, wherein the non-anchor carrier configuration comprises a non-anchor carrier frequency list and a non-anchor carrier configuration parameter list,
wherein each non-anchor carrier frequency in the non-anchor carrier frequency list corresponds to one or more items in the non-anchor carrier configuration parameter list;
determining, by the terminal, according to the non-anchor carrier configuration, resource information for performing random access or monitoring pages with the network device;
obtaining, by the terminal, first indication information broadcast by the network device, wherein the first indication information instructs the terminal to monitor pages through a first non-anchor carrier or a first downlink non-anchor carrier;
receiving, by the terminal, a carrier configuration to be monitored for receiving a control channel; and
determining, according to a preset technique, that the terminal selects a j-th carrier to monitor and receive the control channel when the terminal selects an i-th carrier in a random access carrier configuration to initiate random access, wherein the j-th carrier is selected in the carrier configuration to be monitored for receiving the control channel.

2. The method of claim 1, further comprising:
obtaining, by the terminal, second indication information broadcast by the network device, wherein the second indication information instructs the terminal to perform random access through a second non-anchor carrier or a second uplink non-anchor carrier.

3. The method of claim 1, further comprising:
obtaining, by the terminal, third indication information broadcast by the network device, wherein the third indication information instructs the terminal to monitor pages through a first anchor carrier.

4. The method of claim 1,
wherein the non-anchor carrier configuration includes a random access resource configuration list that includes a correspondence relationship between a plurality of non-anchor carriers and a plurality of radio coverage levels.

5. The method of claim 1, wherein the preset technique comprises:
$j=(i+N_{offset})$ mod Npd, wherein $N_{offset}$ is a preset value or a constant, Npd is a total number of carriers in the carrier configuration monitored for receiving the control channel, Npa is a total number of carriers in the random access carrier configuration, and a minimum value of i is 1 and a minimum value of j is 1.

6. The method of claim 1, wherein the preset technique comprises:
determining that j=i in response to determining that Npd=Npa; and
determining that $j=(i+N_{offset})$ mod Npd in response to determining that Np≠Npa,
wherein $N_{offset}$ is a preset value or a constant, Npd is a total number of carriers in the carrier configuration monitored for receiving the control channel, Npa is a total number of carriers in the random access carrier configuration, and a minimum value of i is 1 and a minimum value of j is 1.

7. A terminal, comprising a processor and a memory storing instructions executable by the processor, wherein the instructions, when executed by the processor, execute the following operations:
receive a non-anchor carrier configuration broadcast by a network device, wherein the non-anchor carrier configuration comprises a non-anchor carrier frequency list and a non-anchor carrier configuration parameter list,
wherein each non-anchor carrier frequency in the non-anchor carrier frequency list corresponds to one or more items in the non-anchor carrier configuration parameter list;
determine according to the non-anchor carrier configuration, resource information to perform random access or monitoring pages with the network device;
obtain first indication information broadcast by the network device, wherein the first indication information instructs the terminal to monitor pages through a first non-anchor carrier or a first downlink non-anchor carrier;
receive a carrier configuration to be monitored to receive a control channel; and
determine, according to a preset technique, that the terminal selects a j-th carrier to monitor and receive the control channel when the terminal selects an i-th carrier in a random access carrier configuration to initiate random access, wherein the j-th carrier is selected in the carrier configuration to be monitored for receiving the control channel.

8. The terminal of claim 7, wherein the operations further comprise:
obtain second indication information broadcast by the network device, wherein the second indication information instructs the terminal to perform random access through a second non-anchor carrier or a second uplink non-anchor carrier.

9. The terminal of claim 7, wherein the operations further comprise:
obtain third indication information broadcast by the network device, wherein the third indication information instructs the terminal to monitor pages through a first anchor carrier.

10. The terminal of claim 7,
wherein the non-anchor carrier configuration includes a random access resource configuration list that includes a correspondence relationship between a plurality of non-anchor carriers and a plurality of radio coverage levels.

11. The terminal of claim 7, wherein the preset technique comprises:
$j=(i+N_{offset})$ mod Npd, wherein $N_{offset}$ is a preset value or a constant, Npd is a total number of carriers in the carrier configuration monitored for receiving the control channel, Npa is a total number of carriers in the random access carrier configuration, and a minimum value of i is 1 and a minimum value of j is 1.

12. The terminal of claim 7, wherein the preset technique comprises:
determine that j=i in response to determining that Npd=Npa; and
determine that $j=(i+N_{offset})$ mod Npd in response to determining that Np≠Npa,
wherein $N_{offset}$ is a preset value or a constant, Npd is a total number of carriers in the carrier configuration monitored for receiving the control channel, Npa is a total number of carriers in the random access carrier configuration, and a minimum value of i is 1 and a minimum value of j is 1.

13. A non-transitory computer-readable storage medium storing computer-executable instructions that, when executed by a processor, execute a method comprising:
receiving a non-anchor carrier configuration broadcast by a network device, wherein the non-anchor carrier configuration comprises a non-anchor carrier frequency list and a non-anchor carrier configuration parameter list, wherein each non-anchor carrier frequency in the non-anchor carrier frequency list corresponds to one or more items in the non-anchor carrier configuration parameter list;
determining according to the non-anchor carrier configuration, resource information for performing random access or monitoring pages with the network device;
obtaining first indication information broadcast by the network device, wherein the first indication information instructs a terminal to monitor pages through a first non-anchor carrier or a first downlink non-anchor carrier;
receiving a carrier configuration to be monitored for receiving a control channel; and
determining, according to a preset technique, that the terminal selects a j-th carrier to monitor and receive the control channel when the terminal selects an i-th carrier in a random access carrier configuration to initiate random access, wherein the j-th carrier is selected in the carrier configuration to be monitored for receiving the control channel.

14. The non-transitory computer-readable storage medium of claim 13, wherein the method further comprises:
obtaining second indication information broadcast by the network device, wherein the second indication information instructs the terminal to perform random access through a second non-anchor carrier or a second uplink non-anchor carrier.

15. The non-transitory computer-readable storage medium of claim 13, wherein the method further comprises:
obtaining third indication information broadcast by the network device, wherein the third indication information instructs the terminal to monitor pages through a first anchor carrier.

16. The non-transitory computer-readable storage medium of claim 13,
wherein the non-anchor carrier configuration includes a random access resource configuration list that includes a correspondence relationship between a plurality of non-anchor carriers and a plurality of radio coverage levels.

17. The non-transitory computer-readable storage medium of claim 13, wherein the preset technique comprises:
$j=(i+N_{offset})$ mod Npd, wherein $N_{offset}$ is a preset value or a constant, Npd is a total number of carriers in the carrier configuration monitored for receiving the control channel, Npa is a total number of carriers in the random access carrier configuration, and a minimum value of i is 1 and a minimum value of j is 1.

18. The non-transitory computer-readable storage medium of claim 13, wherein the preset technique comprises:
determining that j=i in response to determining that Npd=Npa; and
determining that $j=(i+N_{offset})$ mod Npd in response to determining that Np≠Npa,
wherein $N_{offset}$ is a preset value or a constant, Npd is a total number of carriers in the carrier configuration monitored for receiving the control channel, Npa is a total number of carriers in the random access carrier configuration, and a minimum value of i is 1 and a minimum value of j is 1.

* * * * *